(12) United States Patent
Wen et al.

(10) Patent No.: US 7,111,000 B2
(45) Date of Patent: Sep. 19, 2006

(54) RETRIEVAL OF STRUCTURED DOCUMENTS

(75) Inventors: Ji-Rong Wen, Beijing (CN); Hang Cui, Singapore (SG)

(73) Assignee: Microsoft Corporation, Redmond, WA (US)

( * ) Notice: Subject to any disclaimer, the term of this patent is extended or adjusted under 35 U.S.C. 154(b) by 563 days.

(21) Appl. No.: 10/337,138

(22) Filed: Jan. 6, 2003

(65) Prior Publication Data

US 2004/0133557 A1 Jul. 8, 2004

(51) Int. Cl.
*G06F 7/00* (2006.01)
*G06F 15/00* (2006.01)

(52) U.S. Cl. .................... 707/5; 707/3; 707/6; 707/7; 715/501.1; 715/513

(58) Field of Classification Search .............. 707/3, 707/5–7
See application file for complete search history.

(56) References Cited

U.S. PATENT DOCUMENTS

| | | | |
|---|---|---|---|
| 5,500,920 A * | 3/1996 | Kupiec ................... 704/270.1 |
| 5,574,840 A | 11/1996 | Kwatinetz et al. | |
| 5,752,020 A * | 5/1998 | Ando ........................... 707/4 |
| 5,752,242 A * | 5/1998 | Havens ....................... 707/3 |
| 5,778,400 A | 7/1998 | Tateno | |
| 5,999,664 A * | 12/1999 | Mahoney et al. ........... 382/305 |
| 6,014,639 A | 1/2000 | Fohn et al. | |
| 6,380,947 B1 * | 4/2002 | Stead ........................ 345/645 |
| 6,389,425 B1 | 5/2002 | DeMichiel et al. | |
| 6,397,211 B1 * | 5/2002 | Cooper ........................ 707/3 |
| 6,434,554 B1 | 8/2002 | Asami et al. | |
| 2002/0052692 A1 | 5/2002 | Fahy | |
| 2002/0123989 A1 * | 9/2002 | Kopelman et al. ........... 707/3 |
| 2002/0169762 A1 * | 11/2002 | Cardona ....................... 707/3 |
| 2003/0055816 A1 * | 3/2003 | Paine et al. .................. 707/3 |
| 2004/0039734 A1 * | 2/2004 | Judd et al. .................... 707/3 |
| 2005/0108200 A1 * | 5/2005 | Meik et al. ................... 707/3 |

OTHER PUBLICATIONS

M. Kaszkiel and J. Zobel, "Passage Retrieval Revisited," SIGIR, 1997, pp. 178-185, Philadelphia, PA.
M. Geffet and D. Feitelson, "Hierarchical Indexing and Document matching in BoW," Proceedings of the 1st ACM/IEEE-CS joint conference on Digital libraries, 2001, 17 pps, Roanoke, VA.
S. Myaeng, D. Jang, M. Kim, and Z. Zhoo, "A Flexible Model for Retrieval of SGML Documents," Proceedings of ACM-SIGIR Conference on Research and Development in Information Retrieval, 1998, pp. 138-145, Melbourne, Australia.
G. Salton and C. Buckley, "Automatic Text Structuring and Retrieval—Experiments in Automatic Encyclopedia Searching," Proceedings of the 14th annual international ACM SIGIR conference on Research and development in information retrieval, 1991, pp. 21-30, Chicago, IL.
D. Lawrie, W. Croft, and A. Rosenberg, "Finding Topic Words for Hierarchical Summarization", SIGIR Forum ACM USA, 2001, pp. 349-357.

* cited by examiner

*Primary Examiner*—Jean M. Corrielus
*Assistant Examiner*—Anh Ly
(74) *Attorney, Agent, or Firm*—Lee & Hayes, PLLC

(57) ABSTRACT

This disclosure relates to performing a query for a search term of a database containing a plurality of structured documents. Those structured documents that do not include the search term are ferreted or filtered out during an initial search. Matched structured documents which are those structured documents that do contain the search term are evaluated by ranking the individual elements based on how well each individual element matches the search term, and indicating to the user the ranking of the individual elements wherein the individual elements can be accessed by the user.

26 Claims, 13 Drawing Sheets

RETRIEVAL OF STRUCTURED DOCUMENTS

TECHNICAL FIELD

This invention relates to retrieval of documents, and more particularly, to retrieval of structured documents.

BACKGROUND

With the increased usage of computers, networks, the Internet, etc., documents are often searched for certain terms. For example, an individual or student searching for a particular topic may search for an electronic document (hereinafter document) using a specific search engine on a networked computer, a stand-alone computer, or over the Internet for that term. The search engine will return a list of documents that contain the term using computer-based document retrieval technology. Often the documents retrieved for a query are ranked according to how well each particular document matches the queried term(s). The user often has to consider the entire document to determine where a particular search term exists.

Often, memory locations in computers store certain documents in a hierarchical structure. Certain structured computer languages, such as eXtensible Markup Language (XML) that rely on hierarchical structures use tags, or similar devices, that structurally organize data into particular sections or elements. In a retrieved structured document, the user is often not aware where the particular search term exists in each document to find context for the term in the document. This additional user time and effort may be considerable for extended queries.

Many document retrieval systems consider documents as relatively small sized discrete retrieval units that can be queried and returned, such that the documents cannot be further sub-divided. Often a retrieved document is too large for a user to analyze in a meaningful manner. Thus, users often have to carefully review entire retrieved documents in digital library computer applications to determine locations of relevant terms and/or the context of the relevant terms.

Passage retrieval is in principle similar to document retrieval, but involves the additional preliminary stage of extracting passages from documents. One aspect of passage retrieval returns briefer answers to the user. To accomplish this, a document can be decomposed into fixed-length or pre-defined portions using, e.g., the term frequency inverse document frequency (TFIDF) algorithm or a variance of this algorithms, to build index at passage or paragraph level. However, this indexing method on which many document retrieval systems rely does not maintain semantic relationships among the elements in documents. In addition, this indexing mechanism may result in many discrete retrieved elements in a form that requires considerable computer work to present meaningful text to users.

SUMMARY

This disclosure relates to a scalable method and associated system for retrieving structured documents.

In one aspect, a process and associated system comprises performing a query for a search term of a database containing a plurality of structured documents. Those structured documents that do not include the search term are ferreted or filtered out during an initial search. Matched structured documents, which are those structured documents that do contain the search term, are evaluated by ranking the individual elements based on how well each individual element matches the search term. This ranking evaluation is indicated to the user in such a manner that at least certain individual elements can be accessed by the user.

In another aspect, a process involves querying a document having a plurality of elements for a search term. The relevancies of different ones of the elements are weighted based on the search term. Different ones of the elements are ranked in response to the weighted different ones of the elements. Additionally, a path structure of the plurality of elements within the document are displayed wherein the path structure indicates the relevance of different ones of the elements within the document. The elements of the structured documents are scaled based on the structure of the document.

BRIEF DESCRIPTION OF THE DRAWINGS

The same numbers reference like features and components throughout the drawings.

DETAILED DESCRIPTION

Document retrieval systems rely on search engines to locate, and likely display, relevant electronic documents (hereinafter "documents") based on one or more given search terms or words provided by a user. Document retrieval systems are used more (and are required to perform more challenging operations) in the era of the Internet. Different embodiments of a structured document retrieval system 100, different embodiments are illustrated in FIGS.

1 and 2, are particularly suited to retrieve structured documents. Standard Generalized Markup Language (SGML) and eXtensible Markup Language (XML) are examples of recent computer languages that produce and utilize structured documents. The structured document retrieval system 100 is to retrieve the most relevant portion of the document based on the index terms from the user's query, instead of retrieving the entire document. SGML and XML can classify data content differently within their documents using tags that can be user defined. The tags can define the content, as well as the appearance, of the documents. Any computer language that can produce documents arranged in a tree or hierarchical structure can utilize the structured document retrieval process as described herein.

Structured documents are particularly suitable for meaningful information retrieval since the structure (e.g., hierarchy) of the document can provide information about the data stored within each section. One aspect of this disclosure describes how a search engine can search and retrieve portions of a document (e.g., portions being differentiated by tags or some other similar mechanism) that are relevant to the search. The structured document retrieval system can return structured documents having a suitable granularity. The granularity of a document can indicate how much a document can be sub-divided. Granularity represents a measure of the divisibility of documents into distinct elements. Though generally structured documents have a high degree of granularity while non-structured documents lack considerable granularity, there are exceptions to this rule.

Another aspect of this disclosure describes how searching and using one path among a plurality of paths in a plurality of structured documents utilizes an indexing scheme. The structured document retrieval system can display the relevant portions of the structured document either by themselves or in some association to other portions of the document.

Figure 1:
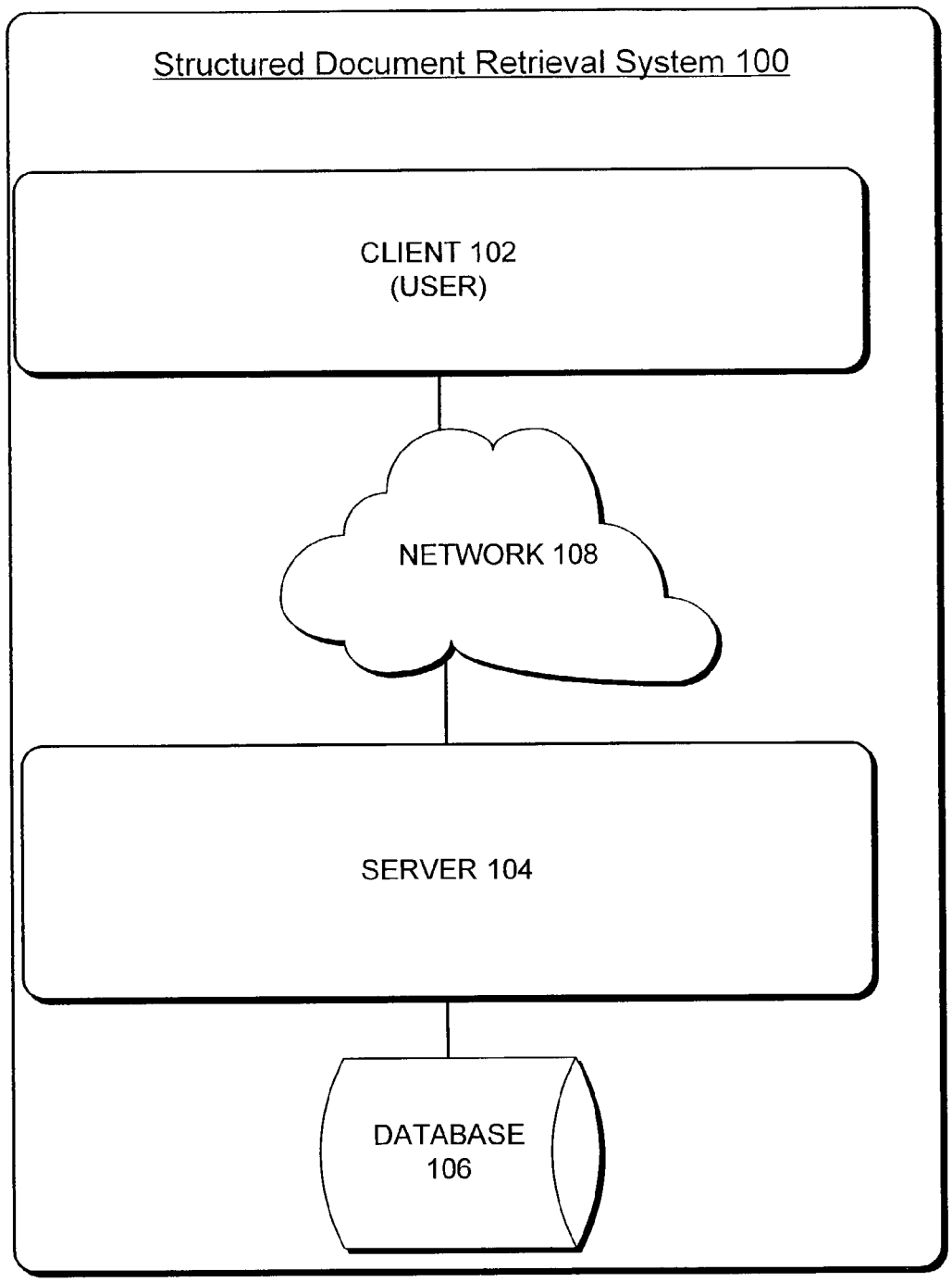
FIG. 1 illustrates a block diagram of one embodiment of a structured document retrieval system.

FIG. 1 illustrates one embodiment of structured document retrieval system 100 (network-based) including a client portion 102, a server portion 104, a database portion 106, and a network portion 108. The embodiment of structured document retrieval system 100 shown in FIG. 1 is network-based. The client portion 102 and the server portion 104 interface over the network portion 108 using standard network communication protocols to transfer data there between. System calls transfer over the network portion 108 to assist in the data transfer process. During normal operation, the server portion 104 accesses data from the database portion 106. The structured document retrieval system 100 searches documents stored in the database 106 based for certain search terms based on the query from the user (at the client portion 102).

Figure 2:
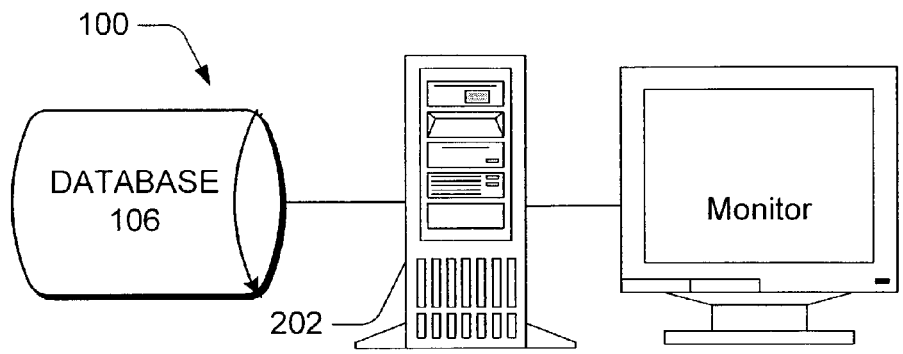
FIG. 2 illustrates a block diagram of another embodiment of a structured document retrieval system.

The FIG. 2 embodiment of structured document retrieval system 100 includes a stand-alone computer 202 and the database portion 106 (the database portion may be a portion of the stand-alone computer. The stand-alone computer 202 can retrieve structured documents from the database portion 106 (to be viewed on a monitor) in a similar manner as the combined client portion 102, server portion 104, and network portion 108 as shown in FIG. 1. As such, the database portion 106 accessed by a structured document retrieval system is con figured with a stand-alone computer as shown in FIG. 2 or a network system as shown in FIG. 1. While the database portion 106 is shown respectively in FIGS. 1 and 2 as a separate component from the network or the stand-alone computer. In reality the database portion may be integrated there within. Further details of the computer structure such as may be associated with the structured document retrieval system 100 are described below.

In different embodiments, the database portion 106 stores structured documents containing data stored in XML format, in HyperText Markup Language (HTML) format, in SGML format, or in other structured format. HTML is the markup language presently predominantly used over the Internet. HTML documents typically have their own structure. HTML is most commonly used to define color, font, etc. that is displayed over computer displays. It is more difficult to use HTML in a structured query in many embodiments of the structured document retrieval system 100 than, for example, XML and SGML because HTML has been traditionally applied with more concern to display style, not the content style. XML and SGML, by comparison, are user defined and are primarily concerned in documents with the data content. HTML, XML, or SGML can be applied to different embodiments of the structured document retrieval system though XML and SGML are particularly suited. There are varieties and modifications of markup languages that are within the intended scope of the present disclosure.

The structured document retrieval system 100 relies on the content and the context of the document in retrieving and displaying the documents. The structured document retrieval system therefore matches the content (e.g., language) of structured documents. The structured document also indicates to the user the context of the retrieved portions of the document. An approximate match can be used for information retrieval. After searching each structure portion, it is determined where the match occurs in each structured portion.

Figure 3:
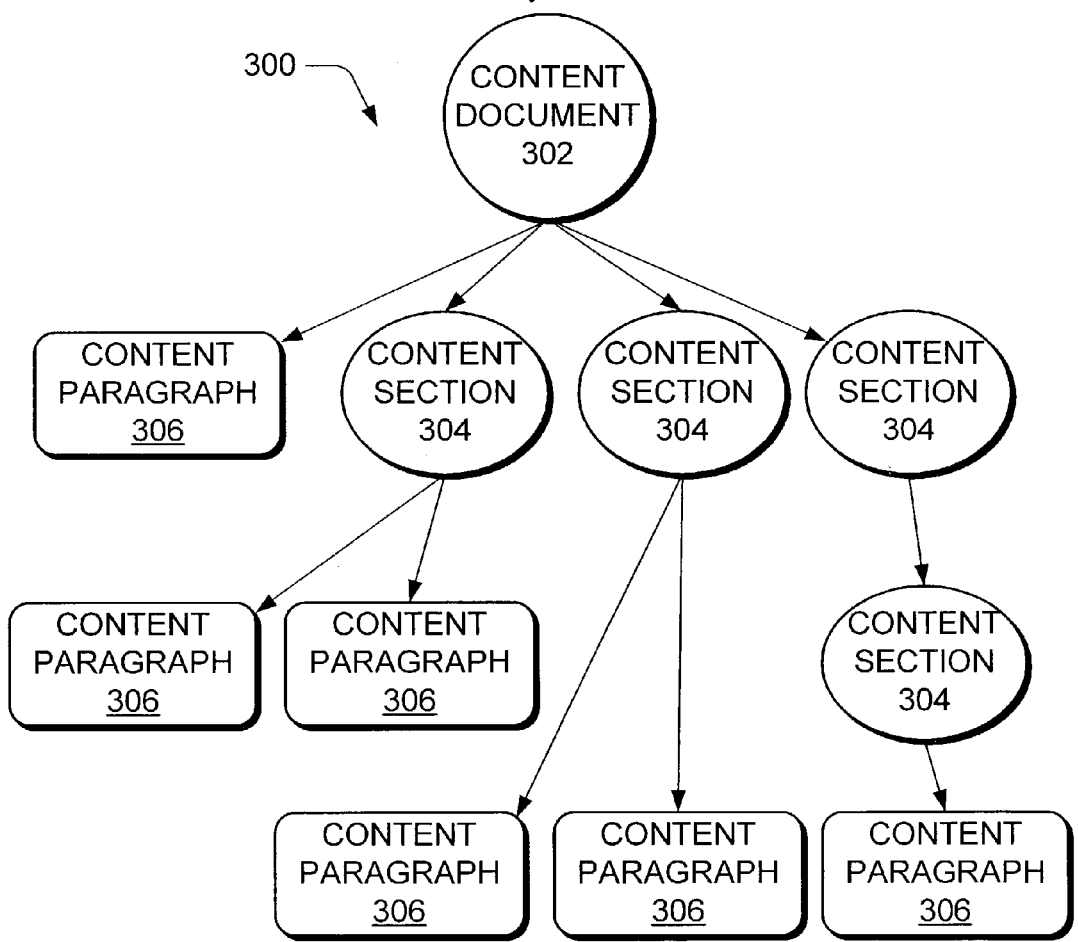
FIG. 3 illustrates a block diagram of one embodiment of the structure of files that uses a hierarchical index.

To explain how the structured document retrieval system retrieves structured documents, certain aspects of structured documents are described. FIG. 3 illustrates the configuration of one embodiment of a structured document 300 and its associated elements such as would be searched by the structured document retrieval system 100. The structured document 300 includes a content document element 302, at least one content section element 304, and at least one content paragraph element 306. A large document will contain many more content section elements 304 and content paragraph elements than illustrated in FIG. 3. Each content section element 304 is dependently associated with the content document element 302 and/or another content section element 304. Each content paragraph element 306 is dependently associated with the content document element 302 and/or a content section element 304. The direction of a dependent relation is indicated by a line having a downwardly-directed arrow. In other words, the arrows on the lines in FIG. 3 flow from a parent node to a child node. The content paragraph elements 306 as illustrated in FIG. 3 are typically structured as leaf node elements, since such leaf node elements have no other depending elements.

Whether a particular portion of the document (i.e., text, images, table, etc.) is characterized as a content document element 302, a content section element 304, or a content paragraph element 306 depends upon the tag associated with each particular element. The use of tags in XML, SGML, HTML, and other mark-up languages is well known and will not be further detailed herein except by noting that XML and SGML both utilize user defined tags. As such, the particular terminology of the content document element 302, the content section elements 304, and the content paragraph elements 306 within a particular document can be dictated by a user or a programmer. It is intended that the content document element 302, the content section elements 304, and the content paragraph elements 306 could be described with different names or terminology while remaining within the intended scope of the present disclosure (as is also true for the elements described relative to FIG. 4).

Figure 4:
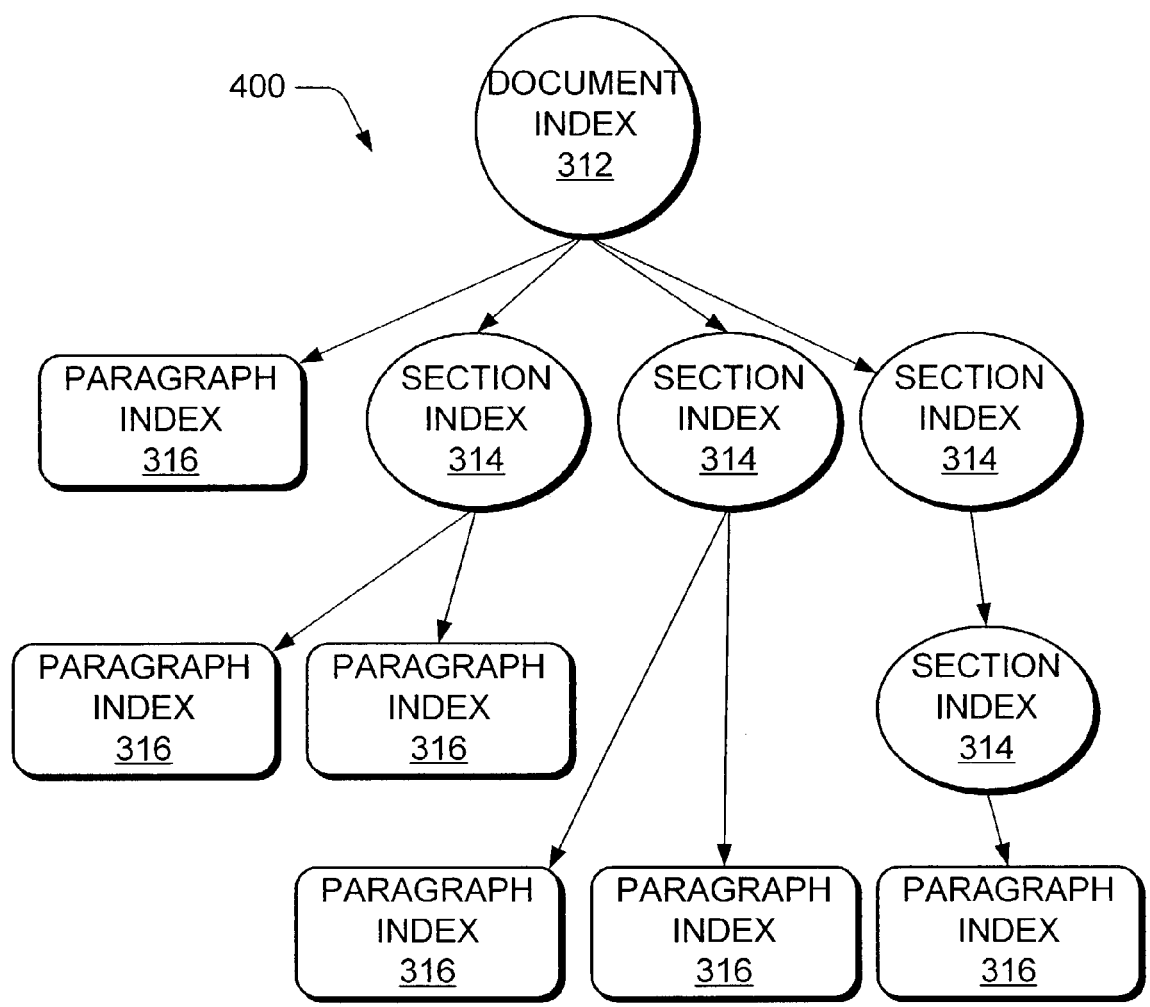
FIG. 4 illustrates a block diagram of one embodiment of hierarchical index that is derived from the structured document of FIG. 3 using the structured document retrieval system such as illustrated in FIG. 1 or FIG. 2.

The structured document retrieval system 100 the content, the context, and the hierarchical structure of documents. FIG. 3 illustrates a block diagram of one embodiment of the content structure 300 of a structured document. FIG. 4, by comparison, illustrates a block diagram of one embodiment of a hierarchical index 400 derived from the content structure 300 of the structured document using the document retrieval system. The content structure 300 of documents (such as illustrated in FIG. 3) can be structurally mapped into a hierarchical index 400 (such as illustrated in FIG. 4) using a hierarchical indexing mechanism where a content element is mapped, in a one to one relationship, to a hierarchical index element. The hierarchical indexing mechanism treats document elements at different levels equally and assigns proper index terms to all of them.

Mapping the content structure 300 of documents to the hierarchical 8 index 300 (as shown respectively in FIGS. 3 and 4) results in a structure including a document index element 312, at least one section index 314, and at least one paragraph index 316. To maintain a one-to-one mapping, each content document element 302 maps to become a document index element 312 by the hierarchical indexing mechanism. Each content section element 304 maps to become a section index element 314 by the hierarchical indexing mechanism. Each content paragraph element 306 maps to become is a paragraph index element 316 by the hierarchical indexing mechanism. Each document index element 312, each section index element 314, and each paragraph index element 316 can store, and transfer, index terms. The elements (either the document index element 312, the section index element 314, and the paragraph index element 316 forming the hierarchical index 400 shown in FIG. 4; or the content document element 302, the content section element 304, and the content paragraph element 306 forming the content structure 300 shown in FIG. 3) in a document can be viewed as being arranged as a concept tree. In a concept tree, the upper element represents a broader concept that covers all the concepts beneath it.

Relevant document elements with arbitrary granularity can be obtained using a scalable element retrieve strategy by employing normal keyword-based queries. The structured document retrieval system 100 includes a hierarchical indexing mechanism and an algorithm. Index terms propagate across the tree structure of XML documents according to terms' frequency and distribution in elements at different levels. As such, each document index element 312, section index element 314, and paragraph index element 316 as shown in FIG. 3 store index terms depending upon the frequency that the corresponding terms appeared in the respective content document element 302, content section element 304, and content paragraph element 306 as shown in FIG. 4. The algorithm (i.e., a scalable document element retrieval algorithm) selects its suitable document elements based on the hierarchical indexing mechanism. The scalable document element retrieval algorithm is realized based on this index structure contained in the document index element 312, the section index element 314, and the paragraph index element 316.

Figure 5A:
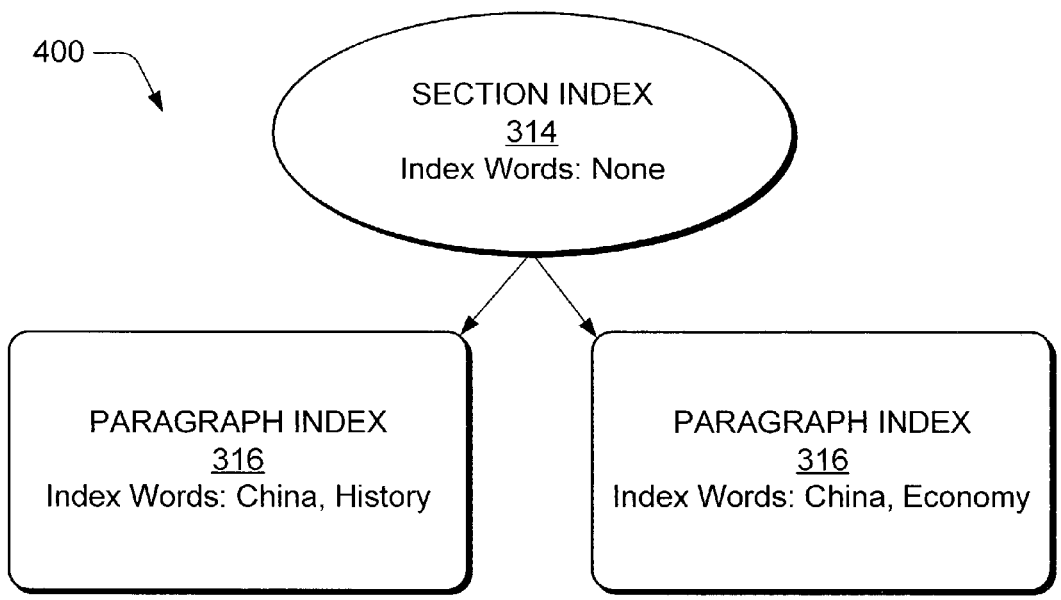
FIG. 5*a* illustrates a block diagram of a portion of a hierarchical index including index words contained in several of the indexes.
Figure 5B:
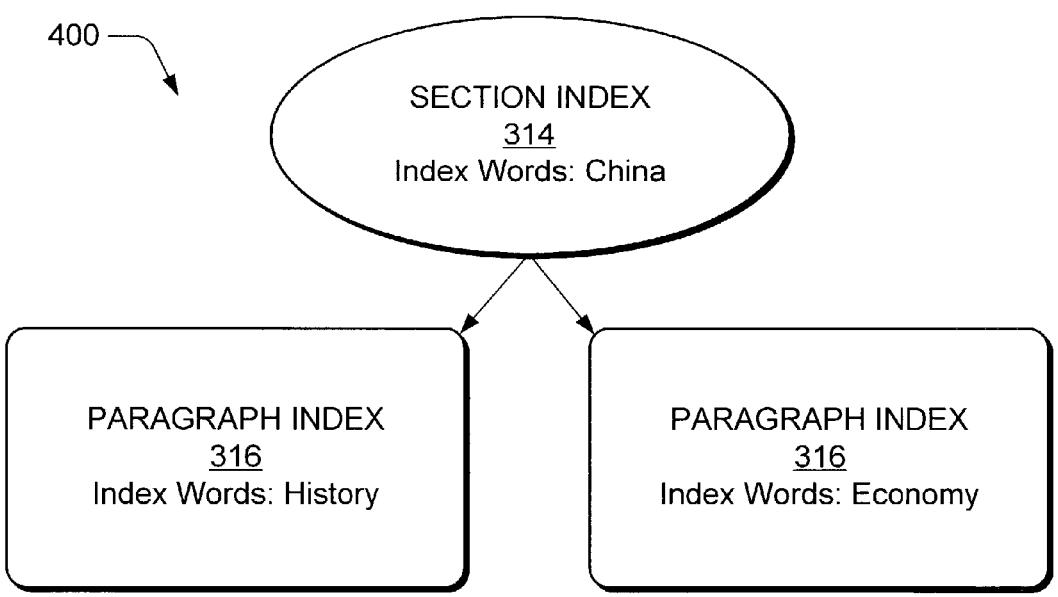
FIG. 5*b* illustrates the portion of the hierarchical index shown in FIG. 5*a* after a transfer of a common index word shared by two child nodes to the parent node.

The hierarchical index 400 shown in FIG. 4 is structured hierarchically (as is the content structure 300 shown in FIG. 3), and as such, includes parent nodes and children nodes. Each parent node is higher than, and inclusive of, the children nodes of that parent node. In the hierarchical tree (and other tree) structure, the child node should inherit the attributes of the parent node. As such, the parent node should be the super concept of the children node. For instance, using an example a document retrieval example as illustrated in FIG. 5b, China is super-concept of history in China, economy of China, culture of China, etc. Therefore, the history in China element, the economy of China element, and the culture of China element should each inherit the attributes of the China element.

The structured document retrieval system 100 overcomes, to some extent, the difficulties that may exist with text length normalization and threshold setting in structured document retrieval. An entire document is often too large for a user to effectively analyze or determine the context of certain terms. It may be beneficial for a user, particularly those that are analyzing longer documents, to analyze only a part of a document. Additionally, it may be important to indicate the context (i.e., relation) between the displayed portion of the document and other portions of the document.

XML and SGML (and also HTML) represent computer languages that provide structured documents in a configuration that are particularly directed to hierarchical indexing and structured document retrieval. Typical XML or SGML documents include a set of logical elements (such as title, sections, subsections, paragraphs, etc). XML and SGML documents are typically structured based on the hierarchical relation, and as such are highly applicable to hierarchical indexing and the structured document retrieval system 100. XML and SGML provide a standard and effective way to explicitly represent the structure of documents using user-defined tags.

In one aspect of the disclosure, document retrieval does not provide effective information retrieval unless the user can retrieve arbitrary levels of elements in documents. Retrieving a set of extremely long document in response to a query is often of little use to the user unless the user is providing with some mechanism to derive the context of the search terms (or index terms) within the document. Obtaining arbitrary levels of elements in documents allows the structured document retrieval system 100 to adapt for querying documents having different lengths and structures. Thus, the retrieval system can return only the relevant elements to the user as determined by the user.

One aspect of the structured document retrieval system 100 is to utilize retrieval techniques (e.g., using indexing techniques) that retrieve more directed data. The structured document retrieval system 100 uses keyword-based queries (such as commonly used in document retrieval to retrieve relevant document elements) that are modified by having arbitrary granularity. One aspect of this disclosure includes two portions—a novel hierarchical indexing mechanism and an algorithm to select and display suitable document elements based on their hierarchical index 400 as shown in FIG. 4.

Certain prior approaches only assign index terms to the leaf elements or fixed-length passages. Elements at different levels are assigned equal and proper index terms. The structured document retrieval system 100 uses the hierarchical indexing mechanism to assigns index terms that can precisely describe the inherent concept for each element while filtering out terms with too broad or too narrow semantics. Consider that a sample document about "China" contains a section "History", which in turn also contains subsections such as "Tang dynasty", "Ming dynasty" and "Qing dynasty", etc. Selecting suitable index terms for the section "History" is challenging. "China" appears to be a relatively broad term that will provide too many results. "Tang", "Ming", and "Qing" by comparison appear to be narrow terms that may miss relevant documents. Terms such as "history" and "dynasty" appear to be good candidate terms. FIGS. 5*a* and 5*b* illustrates one embodiment of suitably filtering an index term within a portion of a hierarchical index 400 including one section index element 314, and two paragraph index elements 316 each configured as a child of the parent section index element. Filtering index terms decreases the occurrences of duplicate index terms in the child node or elements as exist in parent nodes or elements of the hierarchical index 400. Additionally, filtering index terms limits duplicity of index terms in multiple child nodes or element, which are each children of the same parent node or element in the hierarchical index 400. The use of the section index element 314 and the paragraphs index elements 316 in FIGS. 5*a* and 5*b* is arbitrary, but are selected to show index elements (which can contain index terms) arranged in a parent-child configuration. The paragraph (i.e., children) index elements 316 may, or may not be, leaf nodes.

In FIG. 5*a*, one child index element 356 includes the index terms "China" and "History", while another child index element 356 includes the index terms "China" and "Economy". The parent index element 354 includes no index term. The index elements in a document can be arranged as a concept tree where the parent index element(s) 354 represent broader concepts, which apply to all the concepts of the child index element(s) 356 beneath the parent index element 354. Arranging the hierarchical indexing structure as a concept tree in which the index words can be filtered into the fewest elements improves the performance of the search engines since the term that is common in the child index elements 356 does not have to be searched within all of the individual child elements. Instead, the term has to be searched once in the parent search element 354.

The hierarchical indexing mechanism described herein automatically selects proper index terms for each element following a bottom-up propagation fashion. In one embodiment, the indexing method of the structured document retrieval system 100 ensures that an index term that appears in an element does not appear in any children elements of this element. The indexing method saves a considerable amount of storage space and retrieval time. Moreover, this hierarchical indexing mechanism avoids the potential problem of results aggregation since the retrieval process can obtain desirable elements directly due to the thorough distribution of index terms across the whole document tree. This savings in time over a large document search and retrieval process will lead to a considerable savings in time.

Figure 6:
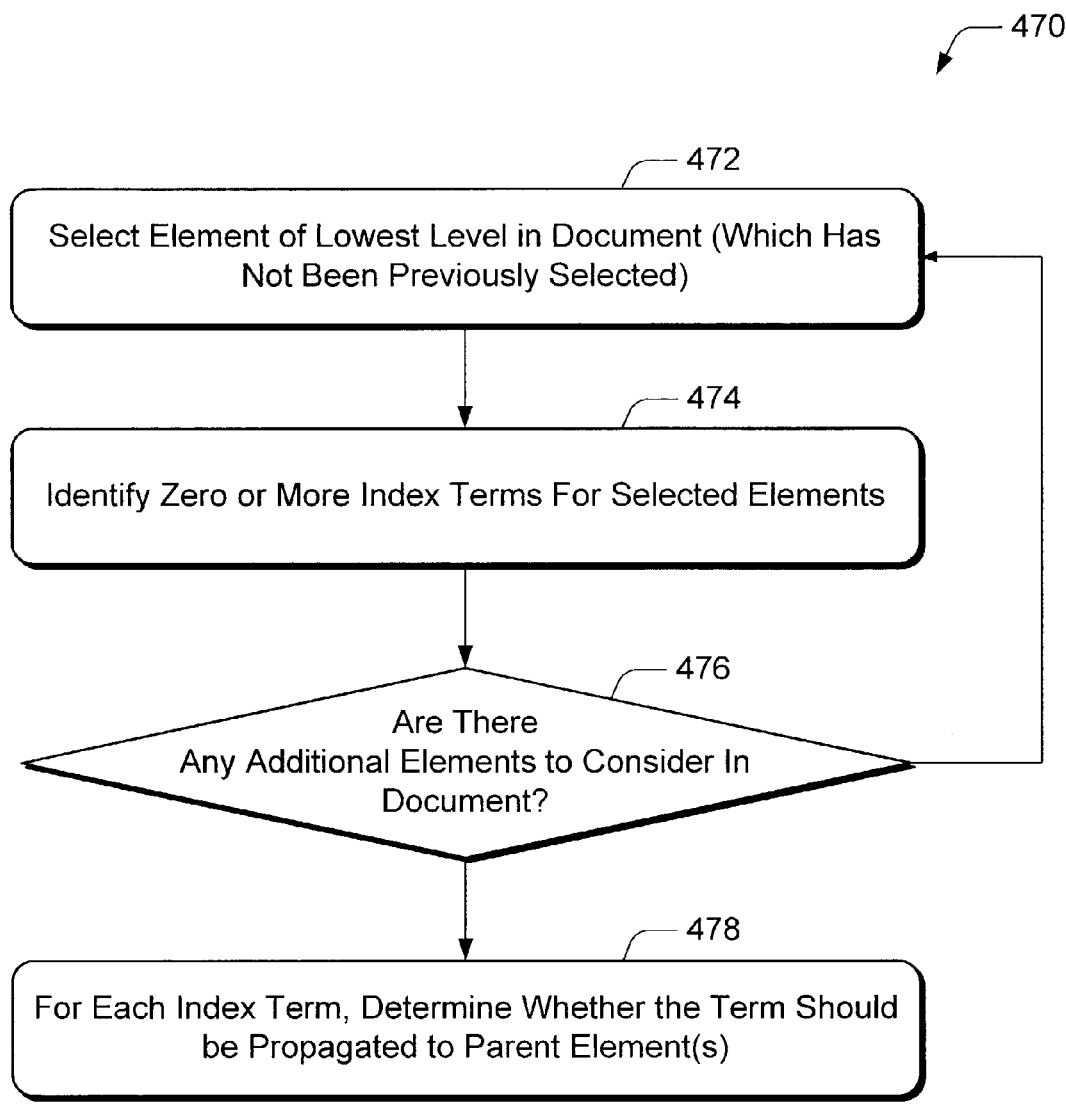
FIG. 6 illustrates a flow chart of one embodiment of hierarchical indexing process.

FIG. 6 shows one embodiment of hierarchical indexing mechanism 470 as applied to the document retrieval system 100. The hierarchical indexing mechanism 470 starts with 472 that selects an element in the lowest level in the document. For example, one of the paragraph index elements 316 is provided in the hierarchical index 400 shown in FIGS. 5*a*. The hierarchical indexing mechanism continues to 474 in that identifies zero or more hierarchical index terms for the selected element.

The hierarchical indexing mechanism continues to decision 478 in which it is determined whether there are any additional elements to consider in the document. Note that 472, 474, and 476 create a loop that considers each element in the hierarchical index 400 for index terms. In one embodiment, the user can limit certain sections of the hierarchical index 400 from consideration either by a prompt provided by the computer during operation or by a preliminary user limiting selection of the areas that the user wishes to search.

Following the looping through the 472, 474, and 476 portion of the hierarchical indexing mechanism 400, the hierarchical indexing mechanism continues to 478. In 478, for each index term in the hierarchical index, the appropriate terms are propagated from the child elements to the parent element in the hierarchical index 400. Such appropriate propagation of terms from the child elements to the parent elements can be equated to the "filtering process" described relative to as illustrated in FIGS. 5*a* and 5*b*.

For example, when a user submits the query "history of China", the title of a retrieved document is "China", and a section is "history". The most suitable path is through the heading "China" is to the section "History" since the "History" section is most relevant to the heading "China". As such, the sections "China" and "History" form the index path from the query "history of China"; a user querying history of China returns this path.

Another part of the method uses a scalable algorithm to select suitable document elements to meet the user's information need. The term "scalable" as applied to the structured document retrieval system 100 indicates that the algorithm can retrieve any granularity of relevant document elements according to the extent of the concept in the user's query. Since the hierarchical index 400 as shown in FIG. 4 provides an effective way to retrieve document elements with any granularity directly, it is important that the retrieval algorithm rank candidate elements according to queries. While the hierarchical index 400 shown in FIGS. 5*a* and 5*b* contain three index elements 314 and 316, the hierarchical index of FIG. 4 includes eleven index elements. Additionally, the number of index elements in a large document may be very large.

In one aspect, the document retrieval system 100 can be scalable. Certain embodiments of the structured document retrieval system allow a user to retrieve documents and display the sections documents in a wide variety of configurations and/or granularities. For example, a user can perform a broad retrieval to access the entire document. As such, using the China example, the user can access the "China" index term yielding the entire hierarchical index 400 of the retrieved document. Additionally, the user can perform a medium retrieval process to retrieve the section index elements 314 as shown in FIG. 4 that correspond to the "History of China." Finally, the user can access a very narrow portion of the document by retrieving the paragraph index elements 316 or section index elements 314 in FIG. 4 that correspond to the Qing dynasty.

A path ranking algorithm as described below allows retrieval and display of documents in a meaningful manner. Using specific indices to retrieve data with structure information has applications in many areas (e.g., database, IR, and XML). The structured document retrieval system 100 includes a hierarchical index 400 that maps directly to the structure of the document. The hierarchical indexing mechanism determines which retrieves document elements with various granularities, while imposing no limits on users' query language. For instance, a structured document retrieval system 100 can be applied to extremely long documents as well as relatively brief documents. For each element or component in the document tree there is a corresponding index element or component in the index tree. When a query comes in, the search engine uses the index tree to locate the most relevant component path or paths (that is most relevant to user's search). This component path(s) is through one or more of the section elements 304 (from the root path or document element 302), to the relevant individual paragraph element 306 as shown in FIG. 3 is referred to as the root of the path. The structured document retrieval system returns the root of the path to the user.

For each document, a hierarchical index 400 having the same structure as the document is established. The structure of the hierarchical index 400 therefore mirrors the content structure 300 of the original document. Index terms are distributed in all elements according to how generally they represent a concept in the document. To effectively assign an index term to an element, the index term should characterize the concept of the element while differentiating the element from other elements. Thus, to is select index terms for an element, the term frequency and distribution in the element should be considered. Also the weight of the index term is compared with other terms in this element. The top ranked index terms are selected as index terms for this element. If a term appears frequently and is distributed evenly in the text of an element, and also has a rank beyond a threshold value, then the index term should be considered as an index term for this element.

The structured document retrieval system 100 takes advantage of the hierarchical structure of certain structured documents. Hierarchical documents (which represent one type of structured documents) include associations between parent elements and children elements. The distribution of a term in a parent element is quantifiable by considering the term's appearances in the children elements of this parent element. In one embodiment, this distribution quantification applies only to children elements that are directly descended from the parent element because the topic of each element should be supported by its directly descendant elements. If a term is distributed evenly in the children element of a section or document, this term would be a good candidate index term for that section or document. Information theory defines entropy as a special concept for capturing information content (or information uncertainty). Entropy is a useful criterion in one embodiment to measure the distribution of a term in an element.

Paragraph elements 306 as shown in FIG. 3 are classified as "atomic" elements since none of the paragraph elements 306 have children elements. Therefore, the traditional TFIDF measure can apply to weight terms in a single paragraph element. A term's weight for a paragraph element 306 becomes:

$$\text{Weight}(t_i, P_j) = \ln(1 + tf(t_i, P_j)) \times \ln \frac{N}{n_i} \quad (1)$$

Weight ($t_i$, Pj) stands for the weight of the term $t_i$ in the paragraph $P_j$. "tf ($t_i$, Pj)" is the term frequency of ti in this paragraph. N denotes the number of documents in the corpus and $n_i$ represents the number of documents containing the term $t_i$.

For elements at other levels that are not atomic elements (e.g., the section element 304 and the document element 302), the term frequency and term distribution are combined to provide the weight for a term. Thus the weight of the term $t_i$ in an arbitrary composite element $E_j$ can be defined as the following:

$$\text{Weight}(t_i, E_j) = \ln(1 + tf(t_i, E_j)) \times I(t_i, E_j) \quad (2)$$

"I($t_i$,$E_j$)" is the entropy measure of the term $t_i$ in element $E_j$ and is defined as:

$$I(t_i, E_j) = \frac{-\sum_{Sub_k \in E_j} tf(t_i, sub_k) \times \ln \frac{tf(t_i, sub_k)}{tf(t_i, E_j)}}{-\sum_{Sub_k \in E_j} \frac{tf(t_i, E_j)}{N(sub)} \times \ln \frac{1}{N(sub)}} \quad (3)$$

$$= \frac{-\sum_{Sub_k \in E_j} tf(t_i, sub_k) \times \ln \frac{tf(t_i, sub_k)}{tf(t_i, E_j)}}{-tf(t_i, E_j) \times \ln \frac{1}{N(sub)}}$$

where $sub_k$ stands for the $k^{th}$ directly descendant element of $E_j$ and N(sub) the number of such descendant elements.

In calculation 3, the term $$-tf(t_i, E_j) \times \ln \frac{1}{N(sub)}$$

plays an important role in the indexing mechanism. Term frequency varies greatly in different elements due to the great variance of text length of them. Entropy measure may encounter the same length normalization problem as other document or passage retrieval methods face. The entropy measure allows generating the entropy when hypothesizing that all appearances of this term in an element are exactly equal in each children element of this element, which is the theoretic maximum value for this term's entropy. The proportion of-this theoretic maximum value is the distribution measure of a term. Later experiments stand that this calculation could almost tradeoff the side effects of various term frequencies in elements at different levels.

Term weights are further normalized in order to compare weights in different elements. Term weights obtained by calculations 1 and 2 are divided by the maximum weight of all terms in the same element. Thus all terms' weights would fall into the range between 0 and 1.

Figure 13:
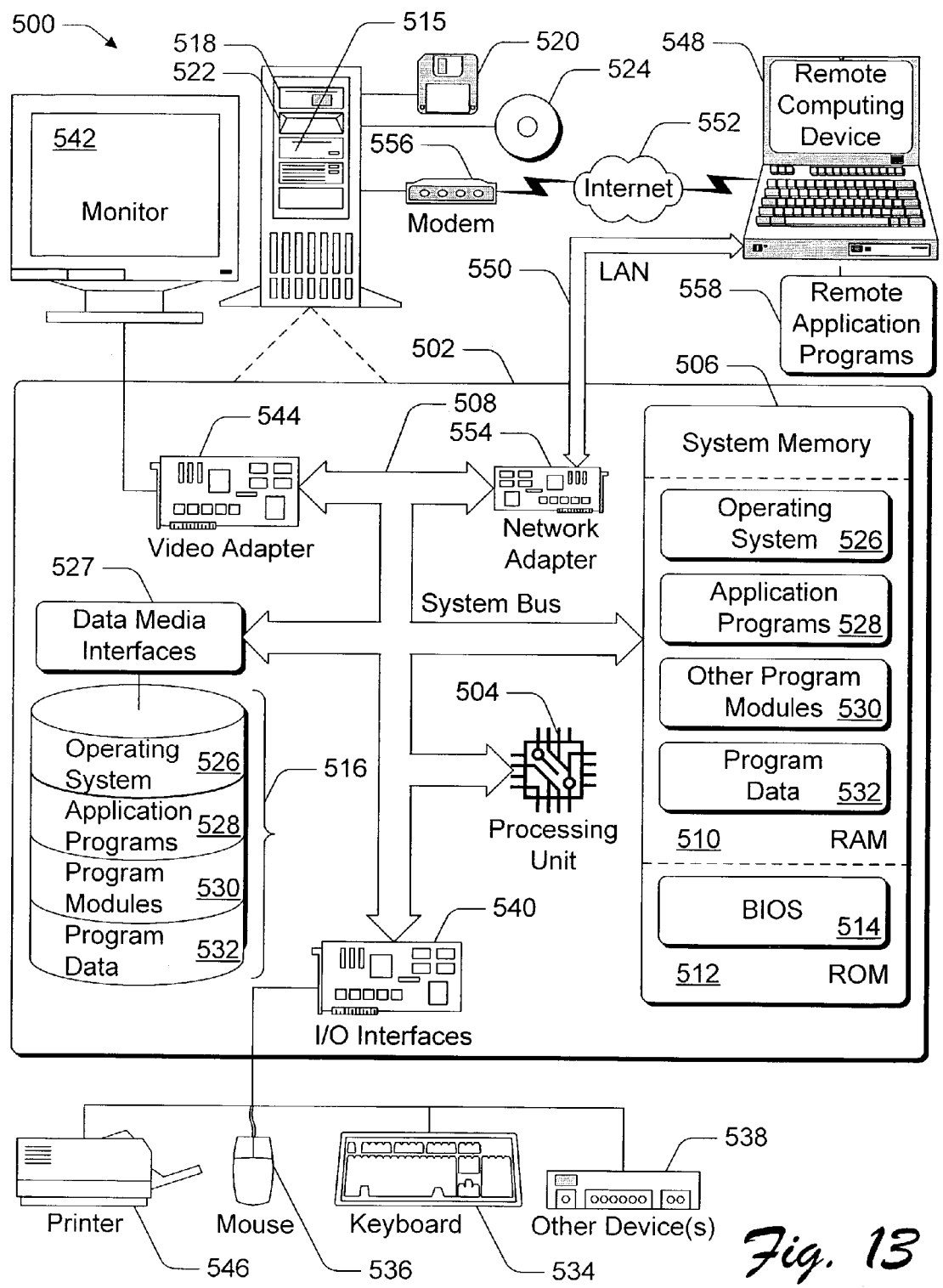
FIG. 13 illustrates a block diagram of one embodiment of a computer environment, such as can be used for the structured document retrieval process.

As mentioned above, a term or element whose weight exceeds a certain threshold should propagate to the upper level since it may stand for a more general concept. The threshold can be dynamically adjusted according to statistics of terms' weights in a specific element. Different embodiments of this dynamic threshold setting can either be performed by the user or operator of the computer environment as illustrated in FIG. 13, or can be performed automatically based on the concepts disclosed herein. Specifically, a term is selected as an index term for an element if and only if its weight is beyond the average value plus the standard deviation of all terms' weights in this element. In other words, index terms in children elements can propagate up to their parent element if their weights satisfy the threshold constraint. Thus, one embodiment of the indexing mechanism can be outlined as follows:

1. For each paragraph element 306, calculate the terms' weight according to calculation 1.

2. For any element $E_j$ at the one upper level (i.e., the section elements 304 or the document element(s) 302) following a bottom-up fashion, calculate term weights using calculation 2. If Weight($t_i$,$E_j$)≧average($E_j$)+std_dev($E_j$), the term $t_i$ is selected as an index term of the element $E_j$ and all sub-elements of $E_j$ would eliminate $t_i$ from their index term list. Here average ($E_j$) denotes the arithmetic average of all terms' weights in the element $E_j$, and std_dev($E_j$) the standard deviation of these weights.

3. Repeat 2 until the root element, i.e., the document element 302, is reached.

This indexing solution utilizes the internal structure of documents thoroughly. Since all terms are compared with each other in the same level and a theoretic maximum value as normalization factor is put in the calculation, the effect of variant lengths of text in different elements is minimized. In addition, the threshold of average value plus standard deviation provides a dynamic local optimum value for determining index terms for a specific element. In addition, an index term of an element is not necessarily required to appear in all sub-elements of this element. Thus more representative index terms other than just a few words in titles are detected.

Figure 7A:
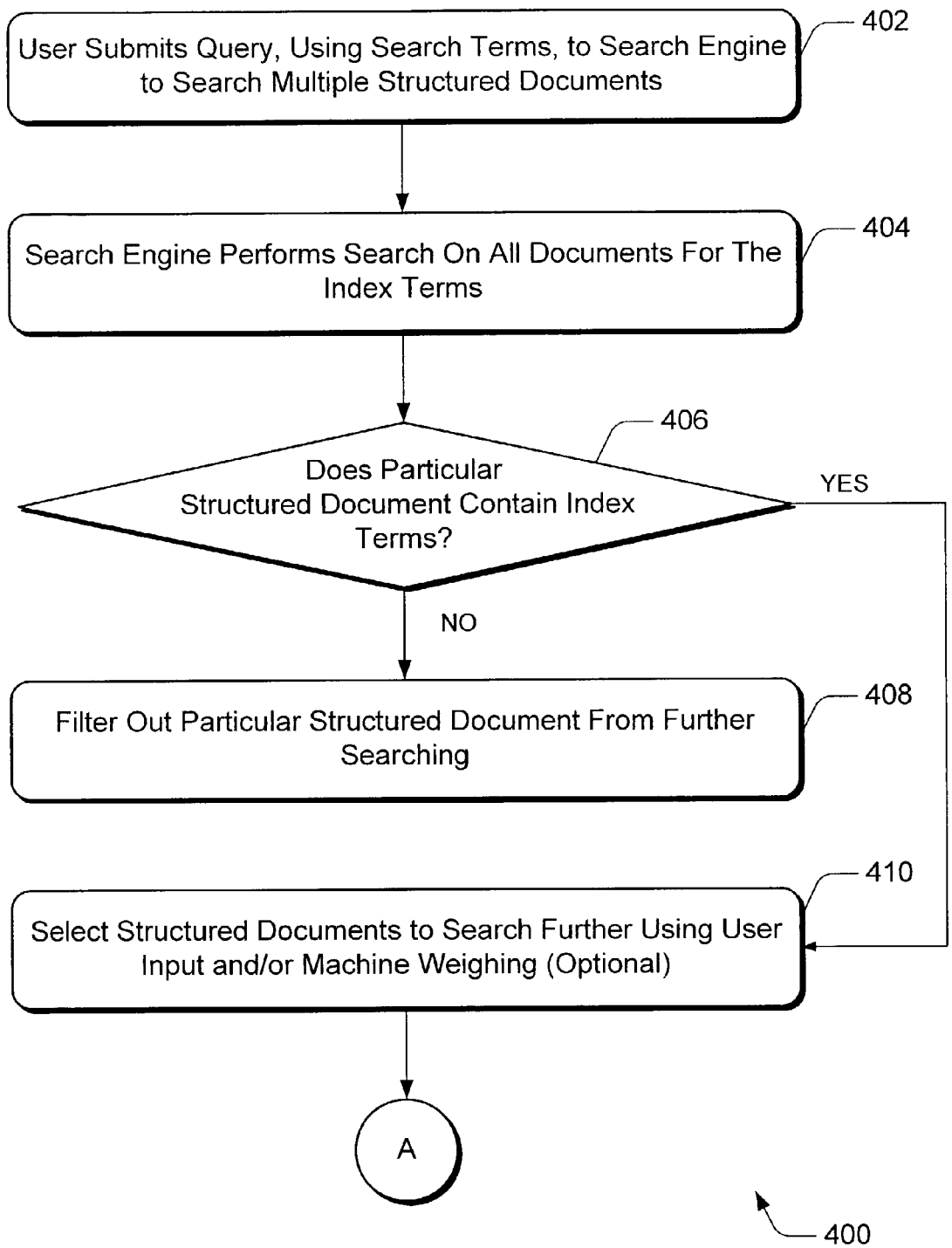
FIGS. 7*a* and 7*b* illustrate a flow chart of one embodiment of a structured document retrieval process.
Figure 7B:
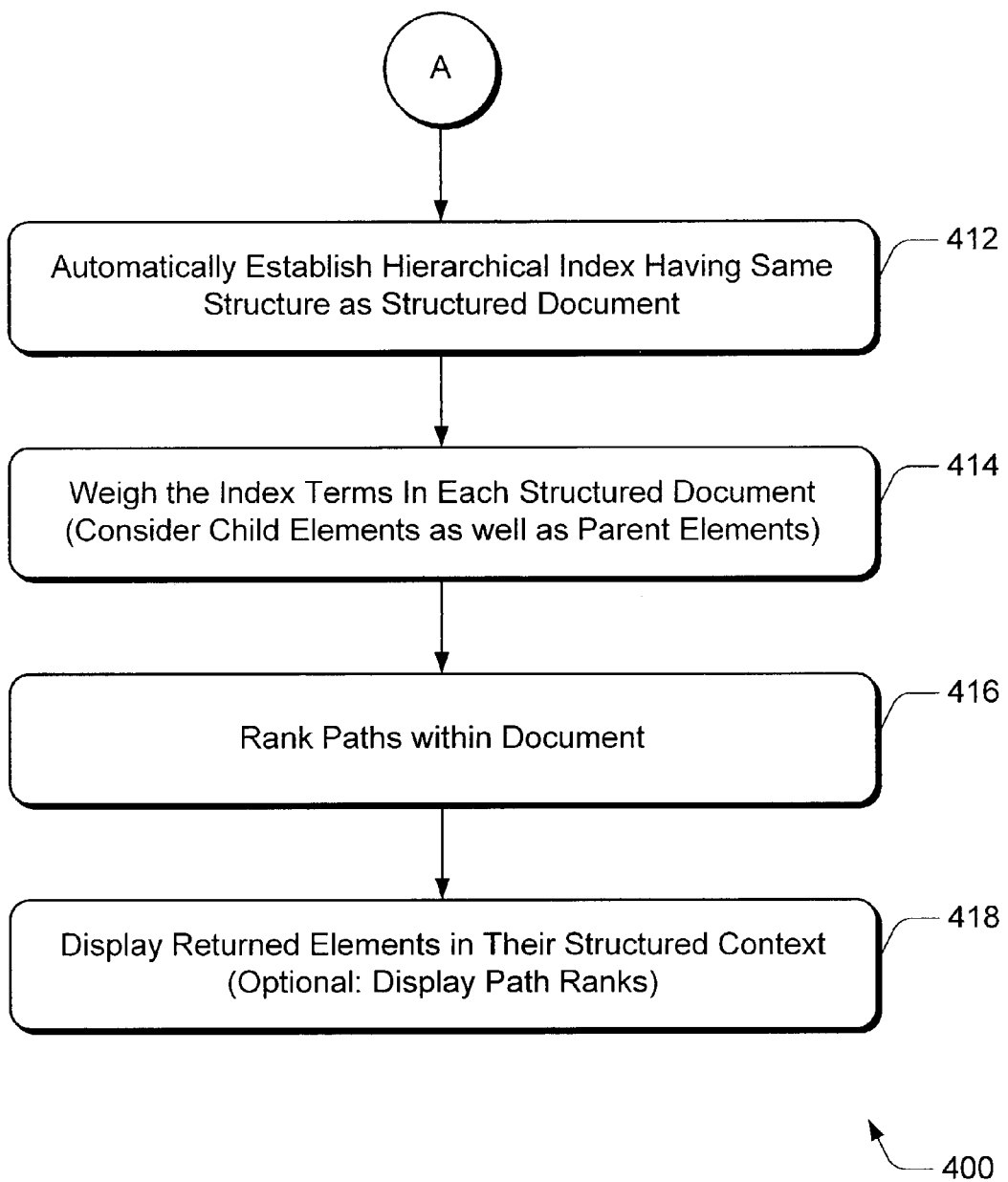

One embodiment of a structured document retrieval process 400 is illustrated in FIGS. 7a and 7b. The structured document retrieval process retrieves the most relevant component of the document to the user instead of retrieving the entire document. Any computer language that has a tree or hierarchical structure can utilize the structured document retrieval process as described herein. In one embodiment of the structured document retrieval system 100 shown in FIG. 1, each section and paragraph is going to be searched individually.

The structured document retrieval method starts with 402 in which the user submits a query, using index words, to an initial search engine in the structured document retrieval system 100 to search multiple structured documents. The initial search engine responds to the original query by filtering out those entire documents that contain one or more of the search terms from those entire documents that do not contain one of more of the search terms.

In certain embodiments of the structured document retrieval system, the query submitted by the user in 402 may be the final input from the user before the returned documents are displayed. The method continues to 404 in which the search engine performs the search on all of the structured documents for the index terms. The search engine used in 404 can be configured to search the entire document together, or search all of the individual elements for the index terms. During 404, however, all documents are entirely searched for the given search term(s). This initial search can be performed by any one of a wide variety of search engines, many of which are commercially available and in common usage. As such, 402 and 404 act in a similar manner as most search engines used today by ferreting out those documents that do not include any search terms included in the query by the user.

The structured document retrieval process 400 continues to decision 406 in which it is determined whether the particular structured document contains the index term(s). If the answer to decision 406 is no, then the structured document retrieval process 400 continues to 408 in which those documents that do not contain any of the search terms are ferreted (i.e., filtered) out. Those documents that 408 applies to do not have to be further considered by the structured document retrieval process 400 (i.e. the structured document retrieval process 400 is terminated) since they do not contain any of the relevant index terms used in the search, and therefore these documents cannot be of interest to the user.

If the answer to decision 406 is yes, then the structured document retrieval process 400 continues to 410 in which the user and/or the structured document retrieval system 100 selects those structured documents to search further. 410 is optional, and the process 400 can instead continue directly to 412. The structured document retrieval system 100 continues to 412 in which the structured document retrieval system 100 automatically establishes the hierarchical index 400 having the same structure as the structured document using mapping. An example of this hierarchical mapping process is described relative to FIGS. 3 and 4. Of those documents matched in 402, 404, 406, 408, and 410, the elements of the documents are individually evaluated. The end element of the path containing the matching search terms is returned. Only those paragraphs that are children of a matched parent will be searched.

The structured document retrieval process 400 continues to 414 in which the index terms in each element of the structured document are is weighted. This weighting determines the relevancy of each element in the document. The weighting in 414, which considers each element distinctly, differs from 404, which searches each document in its entirety. Further details about 414 are described below. The structured document retrieval process 400 continues to 416 in the XML structure, in which it searches for highest level and match, and then searches the next lower level for any matched terms.

Figure 9:
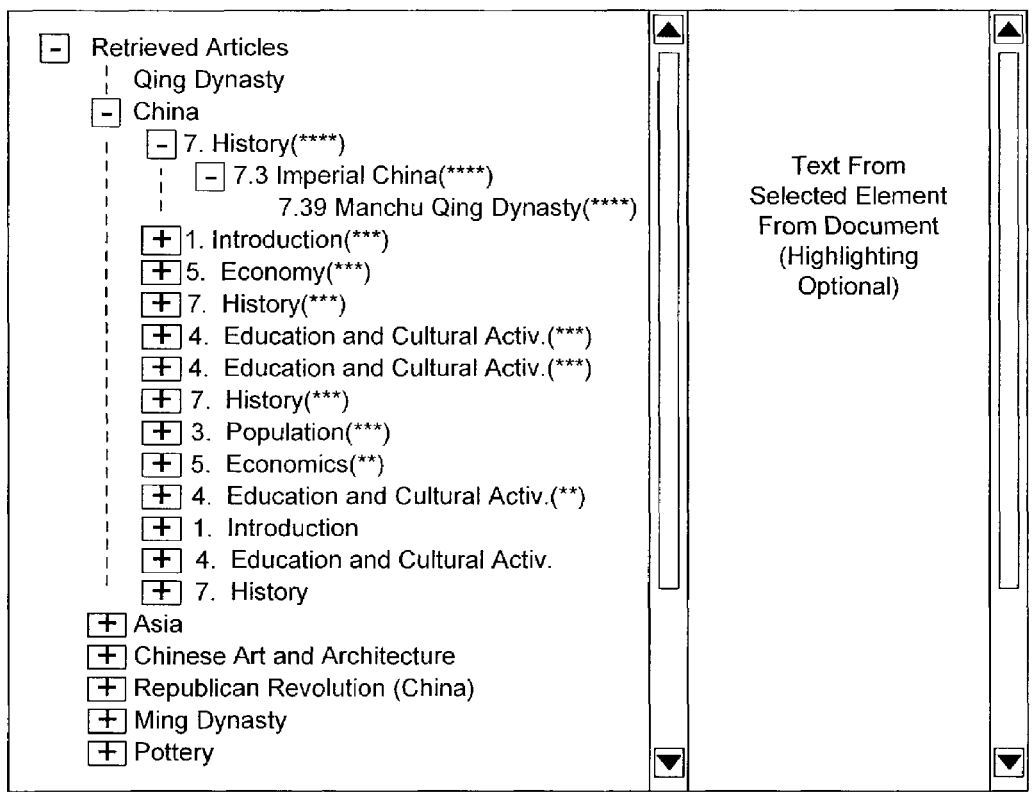
FIG. 9 illustrates one embodiment of a computer display displaying an output from the structured document retrieval process.

The structured document retrieval process 400 continues to 418 in which those documents having the closest match are displayed. In one embodiment of the disclosure, the structured document retrieval system 100 displays an element, as well as the context of the element. For example, as illustrated in FIG. 9 as described below, the right side of a computer display window displays relevant portions of the element or elements. The user has the ability to access neighboring elements, as well. The left side of the window displays the context of the window, in which the structures representing the different elements of the structured document are displayed. In an embodiment, the ranking of the different elements of the document may also be displayed. For each document, there may be more than one path that is displayed. As such, the user doesn't have to search through the entire document to find occurrences of a single search term, only the path.

Figure 8A:
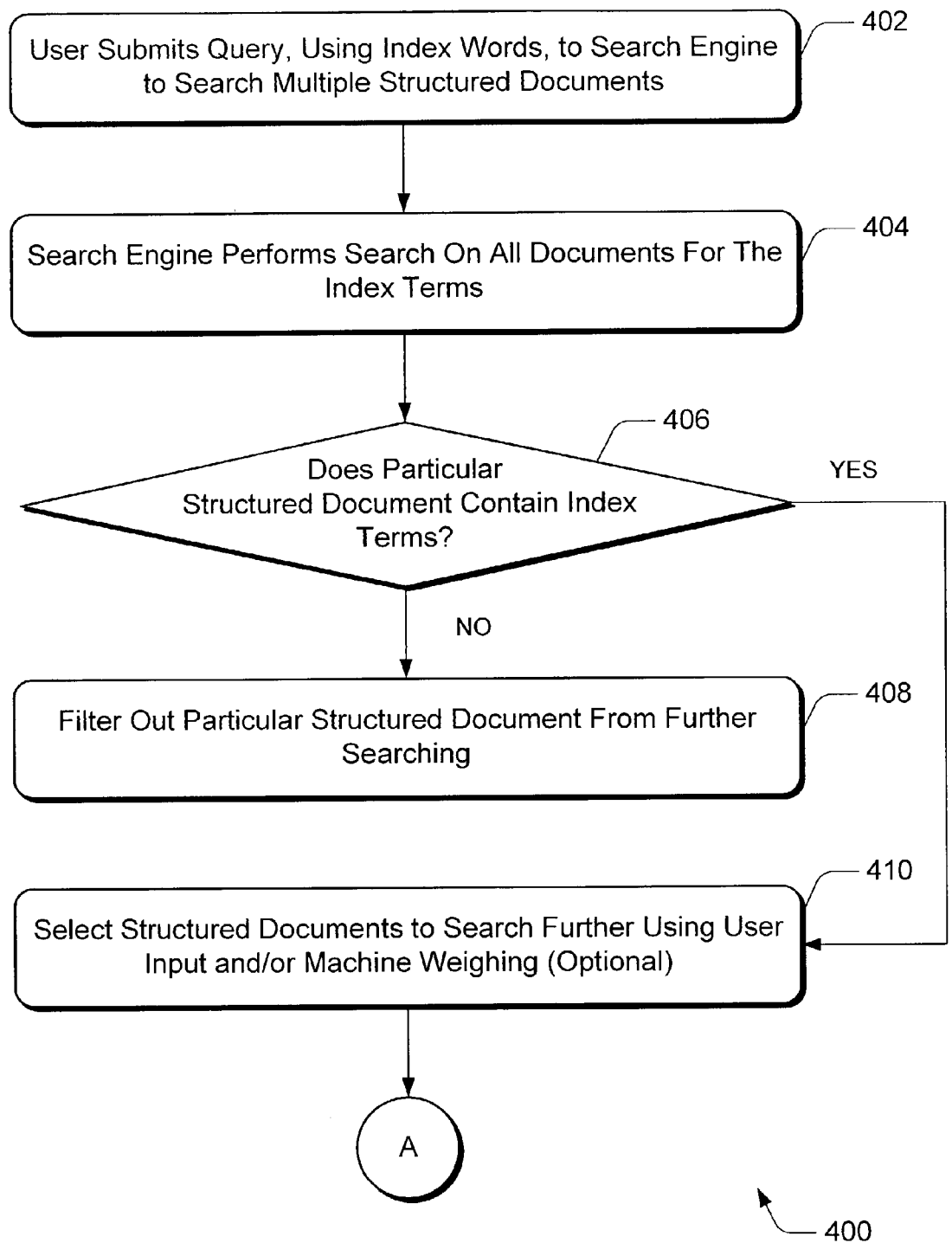
FIGS. 8*a* and 8*b* illustrate a flow chart of another embodiment of a structured document retrieval process.
Figure 8B:
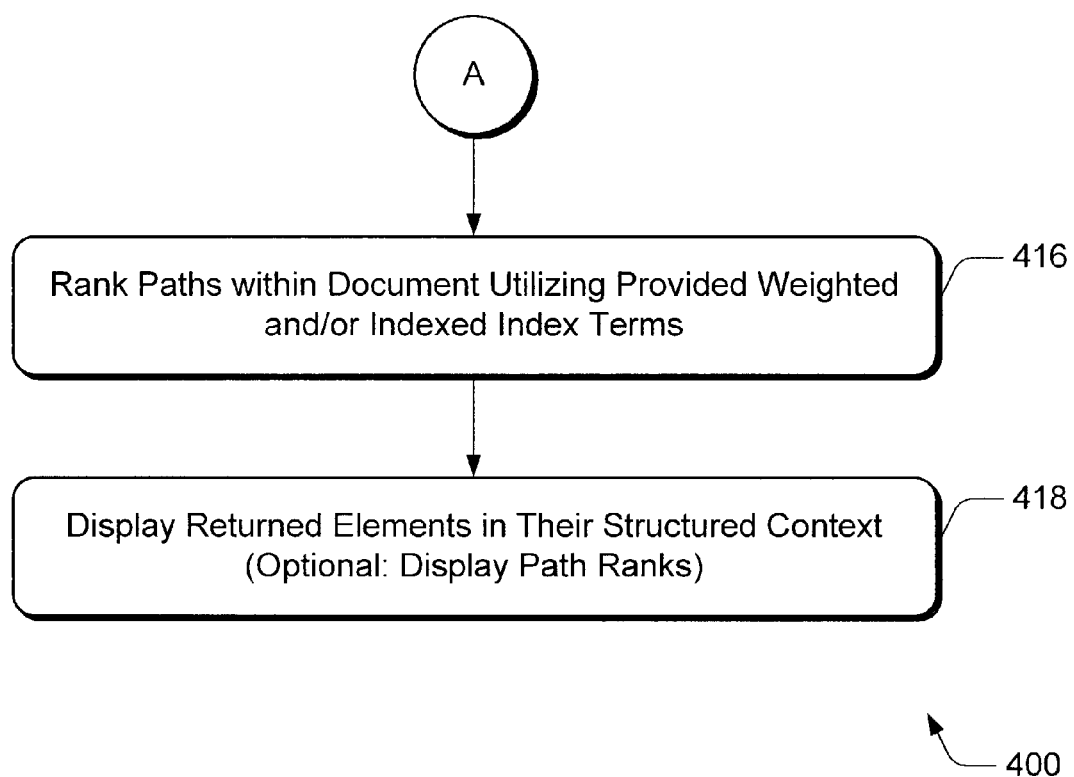

FIGS. 8a and 8b show another embodiment of structured document retrieval process 400 that is similar to the embodiment shown in FIGS. 7a and 7b, except that 412 and 414 are not included. The weighting and/or hierarchical indexing processes of 412 and 414 can be performed separately, and the results can be utilized during the path ranking process illustrated in FIGS. 8a and 8b. For instance, it is envisioned that a supplier of a structured document retrieval process can also supply separately a version including indexed and/or weighted index terms. The weighting and indexing processes are considered separately, and therefore one embodiment of structured document retrieval process 400 can weight but not index, or index but not weight.

Term weighting is now described relative to the structured documents shown in FIG. 3. The terms are weighted by the structured document retrieval system 100. Term weighting provides a mechanism by which the relevance of a particular element can be quantified. After the index terms in a structured document are weighted, the index terms can also be ranked as described herein.

In this section, an embodiment of the scalable retrieval algorithm to select suitable document elements is described which displays to the user based on the hierarchical index 400. Since the hierarchical index 400 provides an effective mechanism to retrieve document elements with any granularity directly, the main task in the retrieval phase is online searching and ranking candidate elements. Certain embodiments of the structured document retrieval system 100 present an interface that displays each retrieved element with their structural context to facilitate users to browse the retrieval results in a convenient way. The displayed user interface plays Ian important role to the user since in many embodiments it displays the rank (relevance) of each element based on the index term input by the user.

For each document, the structured document retrieval system 100 uses a path ranking algorithm to calculate relevance values of all candidate elements to a query. A path for an element is considered to be all elements between the root (the document element) and this element (including the root element and this element) in the document tree. If one element is the ancestor of another element, its path is the subset of the path of the latter. According to one embodiment of the hierarchical indexing mechanism, an element does not share any index terms with its descendants. As such, an element is completely described by its path. Therefore, the element ranking problem can be transformed to a path ranking problem, that is, the goal is to find those element paths with high relevance values to the query.

Considering the China query described above, for the returned document "China", index terms at document level may include "China", "Chinese" while index terms for the section "History" may be "history", "dynasty", etc. To the query "history of China", the element path of the section "History" contains all query terms while the element path of the document "China" contains only one query term. Thus the section "History" is a better answer to the query.

An element's rank is important in determining the relevance of the element to the query. A term's weight for an element path is defined as its weight in an element along the path whose index term list contains this term. The rank for a path according to a given query is defined as:

$$\text{Rank }(Path_p) = \sum_{i=1}^{Q} \text{Weight }(t_i, E_j) \times \ln\frac{N}{n_i} \quad (4)$$

$\ln\frac{N}{n_i}$ is the inverse document frequency (IDF) value of query term $t_i$, which represents the query term's weight, and Q stands for the number of query terms in a query.

Given a coming query, traditional document retrieval techniques can be used to get a list of relevant documents first in order to narrow down the search space. Then when the user selects one of the relevant documents, the system searches for all candidate elements of this document and then ranks their paths according to the query.

The overall process to rank an element is described as below. All elements containing at least one query term are found. Paths are obtained for all candidate elements, and query terms' weights are assigned for elements to paths respectively. The weighted paths are ranked according to calculation 4. The elements corresponding to all, or a select few, of the ranked paths are returned (and typically displayed) in a descending order.

A long-standing problem in structured document retrieval is how to return proper elements which can best satisfy (e.g., are relevant to) the user's query needs. The structured document retrieval system 100 uses the average of all retrieved elements' rank as a dynamic threshold. Elements having a rank beyond the threshold are returned as results. Later experiments show that accurate element retrieval can be attained based on this dynamic threshold.

All returned elements are displayed by the structured document retrieval system 100 with their structural context, which can indicate the position of a returned element in the document tree as well as its surrounding elements as shown in FIG. 9.

FIG. 9 shows a snapshot of the interface of the scalable retrieval system with a given query "Qing dynasty". As such, FIG. 9 can provide a portion of the interface of the document retrieval system. A considerable number of elements were returned for the document named "China". Among the returned elements there are sections and paragraphs. The top one element is a section with the title "Manchu Qing Dynasty" that is dedicated to describe the Qing Dynasty in the history of China. This section is under the section of this document whose title is "History". The left browsing pane indicates each section or paragraph's position relative to the document. As such, information relating to the context of each element is described within the left pane. By comparison, when a user clicks the article "Qing Dynasty", the entire document is accessed since the entire document is concentrated on this topic. The upper level of text element is read to obtain a more general concept description. Titles with asterisks indicate that these elements' rank is beyond the average rank, which is the dynamic threshold.

This section of the disclosure evaluates the performance of the document retrieval method 400 as described with the structured document retrieval system 100. The effects of the threshold settings are also considered. Experiments were conducted on Encarta® Multimedia Encyclopedia corpus, which as of the date of writing this disclosure, contains over 40,000 well structured XML documents. The query set includes 10 queries as listed in Table 1, which appear to be similar queries such as may be input by a typical user of the structured document retrieval system 100. Each query can best be answered by displaying to a user only a portion (i.e. an element) of the relevant documents.

Preliminary experimental results show that not only does the structured document retrieval system 100 perform significantly better than the compared method, but also it overcomes, to some extent, the difficulties of text length normalization and elements selection threshold, which are two long standing problem in structured document retrieval and passage retrieval.

To illustrate the benefits of the present document retrieval system, a passage retrieval system is implemented using the TFIDF Para, which is compared with the structured document retrieval system 100. In one embodiment as per. the TFIDF Para system, only paragraphs are exploited as passages while other structural information is ignored. A term's weight in a paragraph can be defined by the conventional TFIDF measure without normalization, which provides similar results as calculation 1.

TABLE 1

Queries for element retrieval evaluation

| Number | Query |
|---|---|
| 1 | History of China |
| 2 | Qing Dynasty |
| 3 | Atomic Bomb in American History |
| 4 | Ford Motors in World War II |
| 5 | What is the impact of Newton on Calculus? |

TABLE 1-continued

Queries for element retrieval evaluation

| Number | Query |
|---|---|
| 6 | What is the attitude of Microsoft to the World Wide Web? |
| 7 | What is the influence of Lincoln in American History? |
| 8 | Fleet Street in London |
| 9 | Military Aircrafts used in Desert Storm |
| 10 | What missiles can nuclear submarines carry? |

Previous work on passage retrieval or structured document retrieval focused their evaluations mainly on the impact of passage level evidence on retrieving whole documents. None of these conducted special experiments dedicated to evaluate the effectiveness of element retrieval. As a portion of the development of the structured document retrieval system 100, as described above, a series of experiments were run in order to test the ability of the scalable retrieval method to find elements of proper granularity for user queries.

Suppose a user who studies history of military operations intends to find out "what military aircrafts were used in Desert Storm". An initial search may yield two articles Military Aircrafts and Gulf War as highly-ranking results both containing a portion with relevant content. The user has to scan each document (often quite long) to look for relevant content from the entire returned document.

Relevance judgments are made by human assessors. For each query, the relevant elements in documents are judged and selected by the assessors. The measurements used here are similar to those employed in document retrieval. Recall is the fraction of relevant elements, which have been retrieved and precision as the fraction of the retrieved elements which are judged relevant. Since the returned elements should be considered as having a relatively small number of relevant elements, various precision values are not computed in different recall levels. Instead, the overall recall and precision level are calculated and employed to contribute the major portion of a combined F-Value as described in calculation 5.

$$F-\text{Value} = \frac{2}{1/\text{recall} + 1/\text{precision}} \quad (5)$$

When judging what fraction of retrieved elements should be returned to users as answer, both fixed threshold values from 0.1 to 0.9 and dynamic threshold values are used. The dynamic threshold is determined by the average of the rank values of all retrieved elements (for one selected document) (Avg) and the standard deviation of these values (Std_Dev). Thus "Avg" and "Avg+Std_Dev" are exploited as dynamic thresholds in the experiment. The F-Value obtained by these two methods with various thresholds are compared and illustrated in Table 2.

TABLE 2

Average F-Values obtained by Scalable Retrieval
and TFIDF Para methods with various thresholds

| Threshold | TFIDF Para | Scalable Retrieval | % improvement |
|---|---|---|---|
| 0.1 | 0.4225 | 0.6596 | 56.14 |
| 0.2 | 0.4669 | 0.6638 | 42.17 |
| 0.3 | 0.5161 | 0.6668 | 29.21 |
| 0.4 | 0.5490 | 0.6668 | 21.46 |
| 0.5 | 0.5204 | 0.7139 | 37.19 |
| 0.6 | 0.4851 | 0.6995 | 44.20 |
| 0.7 | 0.4995 | 0.7641 | 52.97 |
| 0.8 | 0.4278 | 0.7258 | 69.66 |
| 0.9 | 0.2845 | 0.7351 | 158.40 |
| Avg | 0.4616 | 0.7910 | 71.36 |
| Avg + Sdev | 0.4694 | 0.6167 | 31.39 |
| None/Threshold | 0.2137 | 0.6596 | 208.74 |

The F-values on Table 1 shows improvement of the structured document retrieval process 400 compared to prior methods. F-value is a measure of matching that ranges from 0 to 1, where 1 represents a perfect match and 0 represents no match. Table 2 shows that the scalable retrieval system having various threshold settings displays a significant improvement in retrieval performance over another retrieval method that involves applying TFIDF measure to the paragraph level directly.

Additionally, users in general are more comfortable in dealing with the briefer and more directed results presented by the scalable retrieval method (according to the feedback of assessors). This additional user-comfort is largely due to the hierarchical context structural presentation of the structured document retrieval system 100 in which the user can view the organization of the entire document, the context of a retrieved element relative to the entire element, and the contents of the particular element (or a portion of the element).

The literal context of the element is preserved in results since the scalable retrieval method can return elements in various granularities which may be paragraphs, sections or whole documents according to the specification of queries while previous structured document or passage retrieval methods return only fixed level passages. For example, the query "Qing Dynasty" can be supported best by a section with the title "Manchu Qing Dynasty" under the section of "History" in the document "China". Dozens of paragraphs are contained in this section. In the structured document retrieval system, this section is presented in the first place for this document to the query. However, separate paragraphs with paragraph level ranks are ordered in the TFIDF Para system. Users cannot make clear the correlations or context between these paragraphs ordered only by their individual evidence to this query. Therefore, the hierarchical indexing plus scalable retrieval achieves a relatively high retrieval performance and additionally provides a user-friendly results presentation since it exploits the original structural information of documents thoroughly.

Threshold setting is important for structured document retrieval to obtain desirable elements. In certain prior document retrieval systems, the threshold is fixed at 0.2. Experiments related to the structured document retrieval system 100 indicate that using a single threshold cannot make the system always perform best for all queries since documents that will be queried vary greatly in structure and length. Therefore, the structured document retrieval system 100 utilizes dynamic threshold instead of unchanged (i.e., static) threshold.

Figure 10:
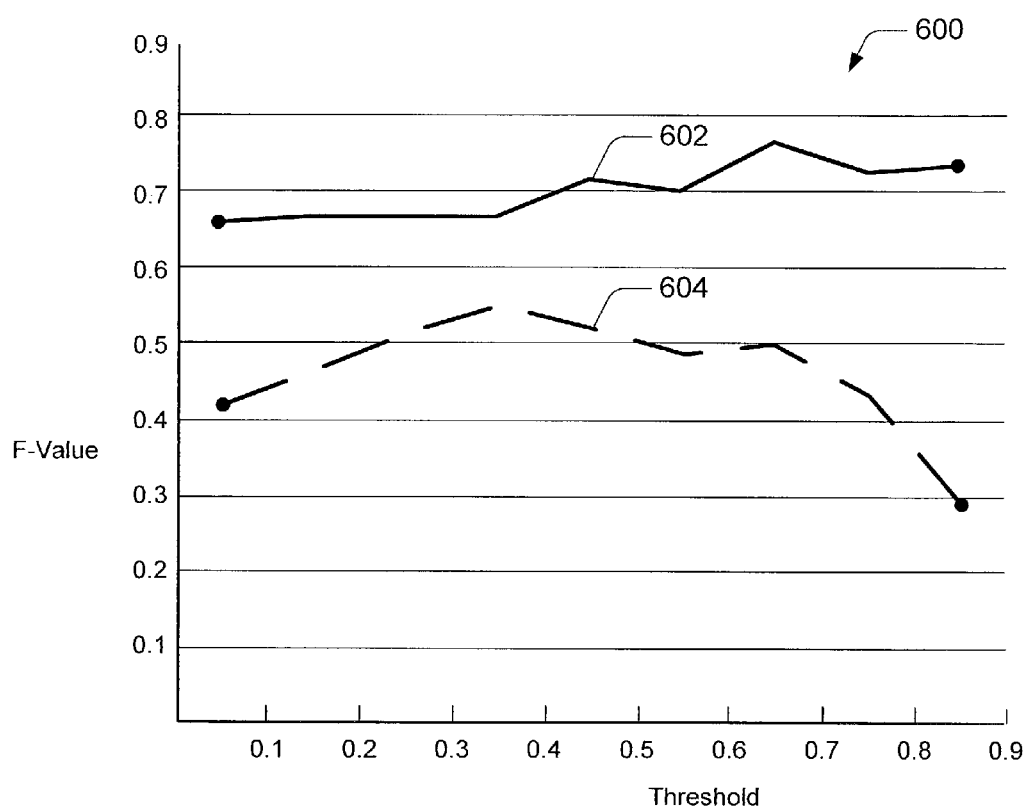
FIG. 10 illustrates a graph plotting F-value versus threshold for the scalable document retrieval process compared with the Para TFIDF method.

Consider how various thresholds affect the retrieval performance of the two methods. FIG. 10 plots in a graph 600 the results of a fixed threshold obtained in the above experiments. In the graph 600, the F-value is plotted as the abscissa against the threshold which is the ordinate. FIG. 10 shows that the scalable retrieval method curve 602 (generated by the scalable retrieval method) is much flatter than the TFIDF curve 604 obtained by TFIDF Para method. The performance of TFIDF Para varies greatly with the changing of threshold as shown in the TFIDF curve 604. The highest F-Value obtained by TFIDF Para in the TFIDF curve 604 is 0.55 (at the threshold 0.4), which is 93% greater than its lowest value 0.28 (at the threshold 0.9—not shown). In comparison, the maximum (at threshold 0.7) and the minimum (at threshold 0.1) F-Value of the scalable retrieval method curve 602 varies only by 16%. This indicates the fact that the hierarchical indexing and scalable retrieval mechanisms make the retrieval process less sensitive to the threshold setting. The values and percentages described herein are illustrative in nature, and are not intended to be limiting in scope.

Figure 11:
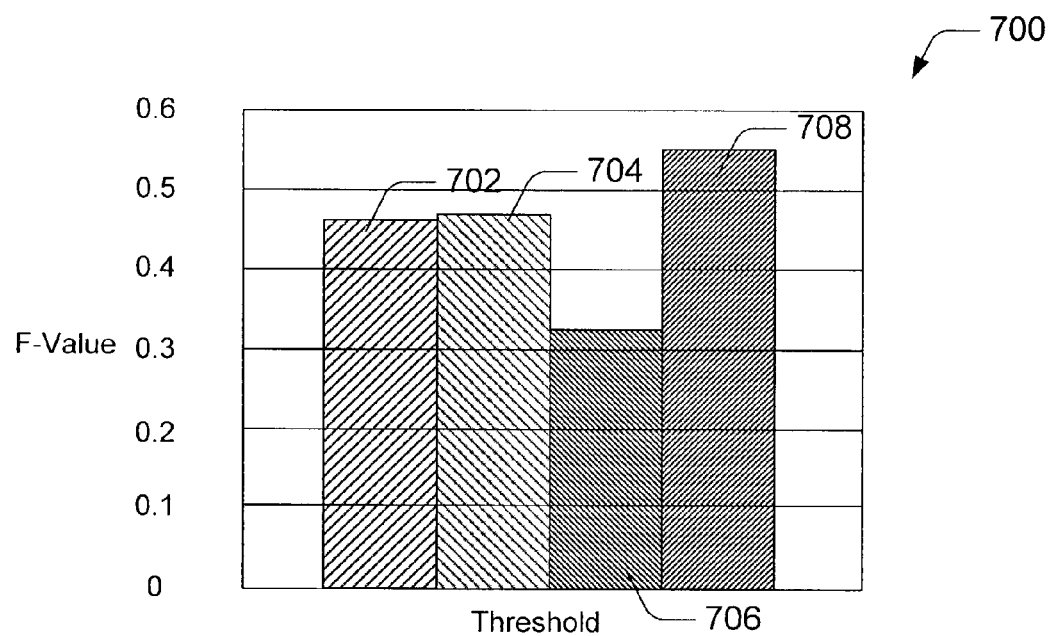
FIG. 11 illustrates a bar chart plotting dynamic threshold settings for the TFIDF Para method.
Figure 12:
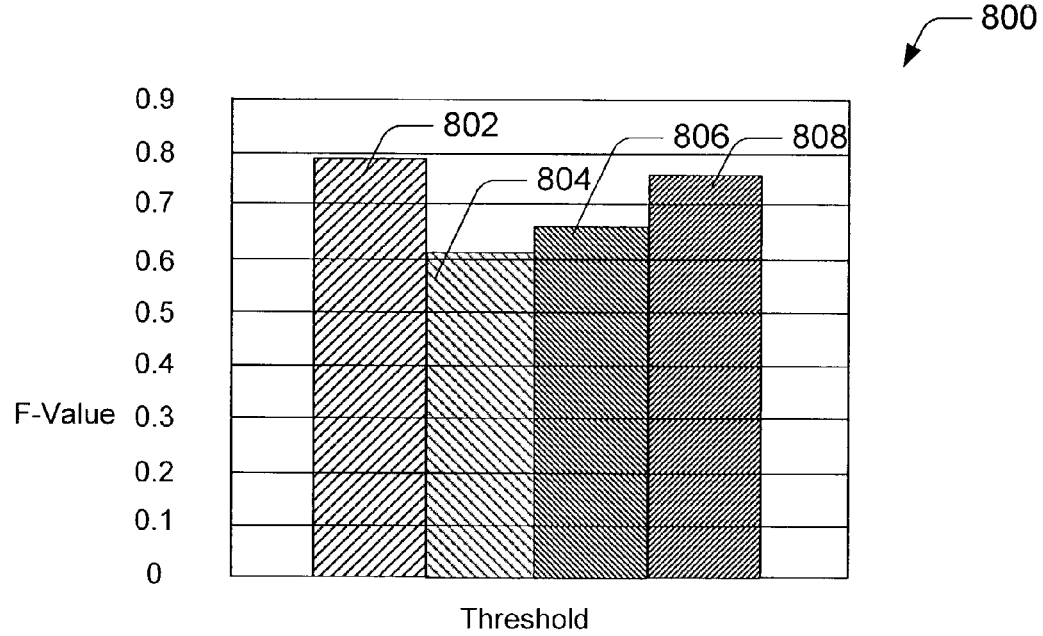
FIG. 12 illustrates a bar chart plotting the dynamic threshold settings for a structured document retrieval process.

Second, consider the effects of dynamic threshold. FIGS. 11 and 12 displays the F-Values (obtained with dynamic thresholds, without thresholds, and with the fixed threshold) plotted against the threshold. In FIG. 11, the dynamic threshold setting for TFIDF bar graph 700 displays the average value 702, the average plus standard deviation value 704, the none threshold value 706, and the maximum value 708. In FIG. 12, the dynamic threshold setting for scalable retrieval bar graph 800 displays the average value 802, the average plus standard deviation value 804, the none threshold value 806, and the maximum value 808. The dynamic threshold setting for TFIDF bar graph 700 and the dynamic threshold setting for scalable retrieval bar graph 800 respectively indicate the performance for TFIDF Para method and scalable retrieval method. FIG. 11 indicates that using dynamic threshold cannot make the paragraph retrieval method achieve the best performance. However, as shown in FIG. 12, the scalable retrieval method can achieve higher performance when using the dynamic threshold of average rank. This testifies that dynamic threshold is a good alternative for fixed threshold and it may be more adaptive to various documents and queries.

Encarta online and Encarta CD versions can both be modified by integrating the scalable structured document retrieval system 100 to add scalable retrieval function thereto. For any database products that contain structured documents (e.g., using XML, SGML, certain applications of HTML, etc.), this technique can be used to improve search and retrieval performance.

FIG. 13 illustrates an example of a suitable computer environment or network 500 which includes a user interface that can, using the correct software and hardware, provide one embodiment of the structured document retrieval system 100. Similar resources may use the computer environment and the processes described herein to perform the computer-related processes shown, for example, in FIGS. 5a, 5b, 6, 7a, 7b, 8a, and 8b.

The computer environment 500 illustrated in FIG. 13 is a general computer environment, which can be used to implement the techniques of the structured document retrieval system 100 described herein. The computer environment 500 is only one example of a computer environment and is not intended to suggest any limitation as to the scope of use or functionality of the computer and network architectures. Neither should the computer environment 500 be interpreted as having any dependency or requirement relating to any one or combination of components illustrated in the exemplary computer environment 500.

The computer environment 500 includes a general-purpose computing device in the form of a computer 502. The computer 502 can be, for example, one or more of a stand alone computer, a networked computer, a mainframe computer, a PDA, a telephone, a microcomputer or microprocessor, or any other computer device that uses a processor in combination with a memory. The components of the computer 502 can include, but are not limited to, one or more processors or processing units 504 (optionally including a cryptographic processor or co-processor), a system memory 506, and a system bus 508 that couples various system components including the processor 504 and the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

The computer 502 typically includes a variety of computer readable media. Such media can be any available media that is accessible by the computer 502 and includes both volatile and non-volatile media, and removable and non-removable media.

The system memory 506 includes the computer readable media in the form of non-volatile memory such as read only memory (ROM) 512, and/or volatile memory such as random access memory (RAM) 510. A basic input/output system (BIOS) 514, containing the basic routines that help to transfer information between elements within the computer 502, such as during start-up, is stored in the ROM 512. The RAM 510 typically contains data and/or program modules that are immediately accessible to, and/or presently operated on, by the processing unit 504.

The computer 502 may also include other removable/non-removable, volatile/non-volatile computer storage media. By way of example, FIG. 13 illustrates a hard disk drive 515 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 515, magnetic disk drive 518, and optical disk drive 522 are each connected to the system bus 508 by one or more data media interfaces 527. Alternatively, the hard disk drive 515, magnetic disk drive 518, and optical disk drive 522 can be connected to the system bus 508 by one or more interfaces (not shown).

The disk drives and their associated computer-readable media provide non-volatile storage of computer readable instructions, control node data structures, program modules, and other data for the computer 502. Although the example illustrates a hard disk within the hard disk drive 515, a removable magnetic disk 520, and a non-volatile optical disk 524, it is to be appreciated that other types of the computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computer environment 500.

Any number of program modules can be stored on the hard disk contained in the hard disk drive 515, magnetic disk 520, non-volatile optical disk 524, ROM 512, and/or RAM 510, including by way of example, the OS 526, one or more application programs 528, other program modules 530, and program data 532. Each OS 526, one or more application programs 528, other program modules 530, and program data 532 (or some combination thereof) may implement all or part of the resident components that support the distributed file system.

A user can enter commands and information into the computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor, flat panel display, or other type of computer display 200 can also be connected to the system bus 508 via an interface, such as a video adapter 544. The computer display is able to display such outputs from the structured document retrieval system 100 as shown in FIG. 9 and described above. In addition to the computer display 200, other output peripheral devices can include components such as speakers (not shown) and a printer 546 which can be connected to the computer 502 via the input/output interfaces 540.

Computer 502 can operate in a networked environment using logical connections to one or more remote computers, such as a remote computer device 548. By way of example, the remote computer device 548 can be a personal computer, portable computer, a server, a router, a network computer, a peer device or other common network node, game console, and the like. The remote computer device, 548 is illustrated as a portable computer that can include many or all of the elements and features described herein relative to the computer 502.

Logical connections between the computer 502 and the remote computer device 548 are depicted as a local area network (LAN) 550 and a general wide area network (WAN) 552. Such networking environments are commonplace in offices, enterprise-wide computer networks, intranets, and the Internet.

When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which can be internal or external to the computer 502, can be connected to the system bus 508 via the input/output interfaces 540 or other appropriate mechanisms. It is to be appreciated that the illustrated network connections are exemplary and that other means of establishing communication link(s) between the computers 502 and 548 can be employed.

In a networked environment, such as that illustrated with the computer environment 500, program modules depicted relative to the computer 502, or portions thereof, may be stored in a remote memory storage device. By way of example, remote application programs 558 reside on a memory device of the remote computer 548. For purposes of illustration, application programs and other executable program components such as the operating system are illustrated herein as discrete blocks, although it is recognized that such programs and components reside at various times in different storage components of the computer 502, and are executed by the data processor(s) of the computer 502. It will be appreciated that the network connections shown and described are exemplary and other means of establishing a communications link between the computers may be used.

Various modules and techniques may be described herein in the general context of the computer-executable instructions, such as program modules, executed by one or more computers or other devices. Generally, program modules include routines, programs, control objects 650, components, control node data structures 654, etc. that perform particular tasks or implement particular abstract data types. Typically, the functionality of the program modules may be combined or distributed as desired in various embodiments.

An implementation of these modules and techniques may be stored on or transmitted across some form of the computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any process or technology for storage of information such as computer readable instructions, control node data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, control node data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

The structured document retrieval system 100 as described above provides an effective way to retrieve elements in smaller granularity than the whole document. A very important application of the structured document retrieval system 100 is to satisfy user's query needs by proper elements in any granularity.

In this disclosure, a hierarchical indexing mechanism for structured documents is described, as well as a scalable structured document retrieval method that operates based on the hierarchical indexing mechanism. An index term is propagated to an upper level element in the tree structure if it represents a more general concept judged by comparing its statistical information in a specific level element with other peer terms' values. Thus in the same structure of the document, index terms are distributed across the whole tree. Each element has a list of index terms which can best represent the concept of the element. The scalable retrieval method is dedicated to provide users with the most satisfying elements in any level.

Experimental results show that the structured document retrieval process as shown in FIGS. 7a, 7b, 8a, and 8b significantly outperform the method of applying TFIDF measure to only paragraph level. In addition, the results with structural context presented in the structured document retrieval system 100 are more acceptable and comfortable to users. Experimental results also indicate that the method was insensitive to threshold setting. Therefore, dynamic threshold is a good solution to such a structured document retrieval method where the documents vary in length.

Although the systems and methods have been described in language to specific to structural features and/or processes, it is to be understood that the invention defined in the appended claims is not necessarily limited to the specific features or processes described. Rather, the specific features are disclosed as preferred forms of implementing the claimed invention.

The invention claimed is:

1. A method, comprising:
processing a query for a search term of a database containing a plurality of structured documents;
ferreting out those structured documents that do not include the search term;
evaluating elements of matched structured documents which are those structured documents that do contain the search term by:
ranking the individual elements based on how well each individual element matches the search term, wherein the ranking the individual elements includes ranking those paths, in which $$\ln \frac{N}{n_i}$$

is the inverse document frequency (IDF) value is of query term $t_i$, which represents the query term's weight, and Q is the number of query terms in a query, using the calculation:

$$\text{Rank}(\text{Path}_P) = \sum_{i=1}^{Q} \text{Weight}(t_i, E_j) \times \ln \frac{N}{n_i};$$

and
indicating to the user the ranking of the individual elements wherein the individual elements can be accessed by the user.

2. The method of claim 1, wherein the indicating to the user includes displaying a hierarchical structure of the matched document to the user the structure.

3. The method of claim 2, wherein the displaying the hierarchical structure includes providing a hierarchical tree that displays the structure of the structured document.

4. The method of claim 1, further comprising scaling the to individual ranked elements based on the granularities of the document.

5. The method of claim 1, wherein the ranking of the individual number is indicated using a number of graphic indicators.

6. The method of claim 5, wherein the number of graphic indicator includes a number of asterisks.

7. The method of claim 1, further comprising weighting individual elements includes an entropy measure.

8. The method of claim 1:
wherein the ferreting out those structured documents includes determining all elements containing at least one query term; and
returning elements corresponding to the ranked paths in a descending order.

9. The method of claim 8, further comprising displaying the elements that have the closest match.

10. The method of claim 8: further comprising: weighting the elements, wherein the weighting includes, for each paragraph element, in which Weight($t_i$,$P_j$) stands for the weight of the term $t_i$ in the paragraph $P_j$, "tf($t_i$,$P_j$)" is the term frequency of $t_i$ in this paragraph, N denotes the number of documents in the corpus, and $n_i$ represents the number of documents containing the term $t_i$, calculating the terms' weight according to the calculation:

$$\text{Weight}(t_i, P_j) = \ln(1 + tf(t_i, P_j)) \times \ln \frac{N}{n_i};$$

for any section element $E_j$ at the upper levels following a bottom-up fashion, in which "I($t_i$,$E_j$)" is the entropy measure of the term $t_i$ in element $E_j$, wherein if Weight$(t_1,E_j) \geq$ average$(E_j)$+std_dev$(E_j)$, the term $t_i$ is selected as an index term of the element $E_j$ and all sub-elements of $E_j$ would eliminate $t_i$ from their index term list, where average $(E_j)$ denotes the arithmetic average of all terms' weights in the element $E_j$, and std_dev$(E_j)$ the standard deviation of these weights calculating term weights, using the calculation Weight($t_i$,$E_j$)=ln(1+tf($t_i$,$E_j$))×I($t_i$,$E_j$); and repeating the calculating the term weights using the calculation Weight($t_i$,$E_j$)=ln(1+tf($t_i$,$E_j$))×I($t_i$,$E_j$)

until the root element (i.e., the document element) is reached.

11. A computer readable medium storing computer executable instructions that when executed by a general process computer is capable of performing a method, the method comprising:
processing a query for a search term of a database containing a plurality of structured documents;
filtering out those structured documents that do not include the search term; ranking the individual elements, in which $$\ln \frac{N}{n_i}$$

is the inverse document frequency (IDF) value of query term $t_i$, which represents the query term's weight, and Q is the number of query terms in a query, including ranking those paths using the calculation:

$$\text{Rank}(\text{Path}_p) = \sum_{i=1}^{Q} \text{Weight}(t_i, E_j) \times \ln\frac{N}{n_i};$$

evaluating matched structured documents which are those structured documents that do contain the search term by ranking the individual elements based on how well each individual element matches the search term; and indicating to the user the ranking of the individual elements wherein the individual elements can be accessed by the user.

12. The computer readable medium which performs the method of claim 11, including indicating to the user the ranking of the individual elements wherein the individual elements can be accessed by the user.

13. The computer readable medium which performs the method of claim 12, wherein the indicating to the user includes displaying a hierarchical structure of the matched document to the user the structure.

14. The computer readable medium which performs the method of claim 13, wherein the displaying the hierarchical structure includes providing a hierarchical tree that displays the structure of the structured document.

15. The computer readable medium which performs the method of claim 11, wherein the ranking of the individual elements is indicated numerically.

16. The computer readable medium which performs the method of claim 11, wherein the elements of the structured document are scaled depending on a granularities of the structured document.

17. The computer readable medium which performs the method of claim 11, wherein the ranking is indicated using a number of asterisks.

18. The computer readable medium which performs the, method of claim 11, wherein the weighting individual elements includes an entropy is measure.

19. The computer readable medium which performs the method of claim 11:
wherein the filtering out those stratified documents includes determining all elements containing at least one query term; and
returning elements corresponding to the ranked paths in a descending order.

20. A method, comprising:
querying a document having a plurality of elements for a search term;
ranking different ones of the elements in response to the weighted different ones of the elements, wherein the ranking different ones of the elements includes ranking the paths, in which where $$\ln\frac{N}{n_i}$$

is the inverse document frequency (IDF) value of query term $t_i$, which represents the query term's weight, and Q is the number of query terms in a query, using the calculation:

$$\text{Rank}(\text{Path}_p) = \sum_{i=1}^{Q} \text{Weight}(t_i, E_j) \times \ln\frac{N}{n_i};$$

scaling the elements of the structured document; and
indicating to the user the ranking of the individual elements wherein the individual elements can be accessed by the user.

21. The method of claim 20, further comprising displaying a path structure of the plurality of elements within the document, the path structure indicates the relevance of different ones of the elements within the document.

22. The method of claim 20:
wherein the weighting the relevancy of different ones of the elements includes determining all elements containing at least one query term;
weighting the relevancy of different ones of the elements includes obtaining paths for all evaluated candidate elements, and assign query terms' weight for elements to paths respectively; and
returning elements corresponding to the ranked paths in an order based on the ranking.

23. A method, comprising:
processing a query for a search term of a database containing a plurality of structured documents;
ferreting out those structured documents that do not include the search term, wherein the ferreting out those structured documents includes determining all elements containing at least one query term;
evaluating elements of matched structured documents which are those structured documents that do contain the search term by:
ranking the individual elements based on how well each individual element matches the search term, wherein the ranking the individual elements includes ranking those paths, in which $$\ln\frac{N}{n_i}$$

is the inverse document frequency (IDF) value of query term $t_i$, which represents the query term's weight, and Q is the number of query terms in a query, using the calculation:

$$\text{Rank}(\text{Path}_p) = \sum_{i=1}^{Q} \text{Weight}(t_i, E_j) \times \ln\frac{N}{n_i};$$

and
returning elements corresponding to the ranked paths in a descending order indicating to the user the ranking of the individual elements wherein the individual elements can be accessed by the user.

24. A method, comprising:
processing a query for a search term of a database containing a plurality of structured documents;
ferreting out those structured documents that do not include the search term;
evaluating elements of matched structured documents which are those structured documents that do contain the search term by:

weighting the elements, wherein the weighting includes, for each paragraph element, in which Weight($t_i,P_j$) stands for the weight of the term $t_i$ in the paragraph $P_j$, "tf($t_i,P_j$)" is the term frequency of $t_i$ in this paragraph, N denotes the number of documents in the corpus, and $n_i$ represents the number of documents containing the term $t_i$, calculating the terms' weight according to the calculation:

$$\text{Weight}(t_i, P_j) = \ln(1 + tf(t_i, P_j)) \times \ln\frac{N}{n_i};$$

for any section element $E_j$ at the upper levels following a bottom-up fashion, in which "I($t_i,E_j$)" is the entropy measure of the term $t_i$ in element $E_j$, wherein if Weight($t_i,E_j$)≧average($E_j$)+std_dev($E_j$), the term $t_i$ is selected as an index term of the element $E_j$ and all sub-elements of $E_j$ would eliminate $t_i$ from their index term list, where average ($E_j$) denotes the arithmetic average of all terms' weights in the element $E_j$, and std_dev($E_j$) the standard deviation of these weights calculating term weights, using the calculation:

$$\text{Weight}(t_i,E_j)=\ln(1+tf(t_i,E_j))\times I(t_i,E_j); \text{ and}$$

repeating the calculating the term weights using the calculation:

$$\text{Weight}(t_i,E_j)=\ln(1+tf(t_i,E_j))\times I(t_i,E_j)$$

until the root element (i.e., the document element) is reached;

ranking the individual elements based on how well each individual element matches the search term, wherein the ranking the individual elements includes ranking those paths, in which $$\ln\frac{N}{n_i}$$

is the inverse document frequency (IDF) value of query term $t_i$, which represents the query term's weight, and Q is the number of query terms in a query, using the calculation:

$$\text{Rank}(\text{Path}_p) = \sum_{i=1}^{Q} \text{Weight}(t_i, E_j) \times \ln\frac{N}{n_i};$$

and indicating to the user the ranking of the individual elements wherein the individual elements can be accessed by the user.

25. A computer readable medium storing computer executable instructions that when executed by a general process computer is capable of performing a method, the method comprising:

processing a query for a search term of a database containing a plurality of structured documents;

filtering out those structured documents that do not include the search term, wherein the filtering out those structured documents includes determining all elements containing at least one query term;

ranking the individual elements, in which $$\ln\frac{N}{n_i}$$

is the inverse document frequency (IDF) value of query term $t_i$, which represents the query term's weight, and Q is the number of query terms in a query, including ranking those paths using the calculation:

$$\text{Rank}(\text{Path}_p) = \sum_{i=1}^{Q} \text{Weight}(t_i, E_j) \times \ln\frac{N}{n_i};$$

evaluating matched structured documents which are those structured documents that do contain the search term by ranking the individual elements based on how well each individual element matches the search term;

returning elements corresponding to the ranked paths in a descending order; and indicating to the user the ranking of the individual elements wherein the individual elements can be accessed by the user.

26. A method, comprising:

querying a document having a plurality of elements for a search term;

ranking different ones of the elements in response to the weighted different ones of the elements wherein:

weighting the relevancy of different ones of the elements includes determining all elements containing at least one query term;

the weighting the relevancy of different ones of the elements includes obtaining paths for all evaluated candidate elements, and assign query terms' weight for elements to paths respectively the ranking different ones of the elements includes ranking the paths, in which where $$\ln\frac{N}{n_i}$$

is the inverse document frequency (IDF) value of query term $t_i$, which represents the query term's weight, and Q is the number of query terms in a query, using the calculation:

$$\text{Rank}(\text{Path}_p) = \sum_{i=1}^{Q} \text{Weight}(t_i, E_j) \times \ln\frac{N}{n_i};$$

scaling the elements of the structured document;

returning elements corresponding to the ranked paths in an order based on the ranking; and indicating to the user the ranking of the individual elements wherein the individual elements can be accessed by the user.

* * * * *